(12) United States Patent
Naraki et al.

(10) Patent No.: US 9,675,935 B2
(45) Date of Patent: Jun. 13, 2017

(54) METALLOSILICATES, PROCESSES FOR PRODUCING THE SAME, NITROGEN OXIDE REMOVAL CATALYST, PROCESS FOR PRODUCING THE SAME, AND METHOD FOR REMOVING NITROGEN OXIDE WITH THE SAME

(75) Inventors: Yusuke Naraki, Yamaguchi (JP);
Keisuke Tokunaga, Yamaguchi (JP);
Ko Ariga, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 1452 days.

(21) Appl. No.: 13/503,450

(22) PCT Filed: Dec. 21, 2010

(86) PCT No.: PCT/JP2010/072966
§ 371 (c)(1),
(2), (4) Date: Apr. 23, 2012

(87) PCT Pub. No.: WO2011/078149
PCT Pub. Date: Jun. 30, 2011

(65) Prior Publication Data
US 2012/0207669 A1    Aug. 16, 2012

(30) Foreign Application Priority Data

Dec. 22, 2009  (JP) ................................ 2009-290442
Dec. 25, 2009  (JP) ................................ 2009-293723
Dec. 25, 2009  (JP) ................................ 2009-293724

(51) Int. Cl.
*C01B 39/02*        (2006.01)
*B01D 53/94*        (2006.01)
(Continued)

(52) U.S. Cl.
CPC ...... *B01D 53/9418* (2013.01); *B01J 29/7615* (2013.01); *B01J 35/002* (2013.01);
(Continued)

(58) Field of Classification Search
None
See application file for complete search history.

(56) References Cited

U.S. PATENT DOCUMENTS 3,308,069 A    3/1967  Wadlinger et al.
6,620,402 B2 *  9/2003  Jacobsen ............ B01J 29/0308
                                                        423/705
(Continued)

FOREIGN PATENT DOCUMENTS

CN        1735451        2/2006
CN        101516778      8/2009
(Continued)

OTHER PUBLICATIONS

Yan et al, synthesis of single crystals of zeolite beta by using two silica sources, 1994, chemical research in chinese universities, vol. 10, No. 2.*
(Continued)

*Primary Examiner* — Melvin C Mayes
*Assistant Examiner* — Stefanie Cohen
(74) *Attorney, Agent, or Firm* — Greenblum & Bernstein, P.L.C.

(57) ABSTRACT

The invention relates to: a β-type iron silicate which has a fluorine content not more than 400 ppm by weight on a dry basis and in which the crystal grains have a truncated square bipyramidal morphology in an examination with a scanning electron microscope and the whole or part of the iron is contained in the β-type framework structure, and a process for producing the iron silicate; anther β-type iron silicate, and a process for producing the iron silicate; and a nitrogen
(Continued)

oxide removal catalyst containing the other β-type iron silicate, a process for producing the catalyst, and a method for nitrogen oxide removal with the catalyst.

4 Claims, 4 Drawing Sheets

(51) Int. Cl.
*B01J 29/76* (2006.01)
*B01J 35/00* (2006.01)
*B01J 35/02* (2006.01)
*C01B 39/08* (2006.01)
*C01B 39/48* (2006.01)
*F01N 3/20* (2006.01)

(52) U.S. Cl.
CPC ........... *B01J 35/023* (2013.01); *B01J 35/026* (2013.01); *C01B 39/087* (2013.01); *C01B 39/48* (2013.01); *B01D 2255/20738* (2013.01); *B01D 2255/502* (2013.01); *F01N 3/2066* (2013.01); *F01N 2610/02* (2013.01)

(56) References Cited

U.S. PATENT DOCUMENTS

| 7,794,680 | B2 | 9/2010 | Naraki et al. |
| 2006/0088469 | A1 | 4/2006 | Perez-Ramirez |
| 2009/0048095 | A1 | 2/2009 | Li et al. |
| 2009/0155152 | A1 | 6/2009 | Naraki et al. |
| 2010/0003178 | A1 | 1/2010 | Tokunaga et al. |
| 2010/0143224 | A1 | 6/2010 | Li et al. |
| 2010/0254894 | A1* | 10/2010 | Wang ................ C01B 37/02 423/704 |

FOREIGN PATENT DOCUMENTS

| CN | 101827654 | 9/2010 |
| EP | 0 915 056 | 5/1999 |
| EP | 2072128 | 6/2009 |
| JP | 2-293021 | 12/1990 |
| JP | 5-154349 | 6/1993 |
| JP | 5-305240 | 11/1993 |
| JP | 2605956 | 4/1997 |
| JP | 2691643 | 12/1997 |
| JP | 3269828 | 4/2002 |
| JP | 3477799 | 10/2003 |
| JP | 2004-524142 | 8/2004 |
| JP | 3986186 | 10/2007 |
| JP | 4044984 | 2/2008 |
| JP | 2008104914 A * | 5/2008 |
| JP | 2009-166031 | 7/2009 |
| JP | 2009-166032 | 7/2009 |
| KR | 1998-069234 A | 10/1998 |
| WO | 2008/038422 | 4/2008 |
| WO | 2009/023202 | 2/2009 |
| WO | WO 2009023202 A2 * | 2/2009 |

OTHER PUBLICATIONS

English translation of JP2008104914.*
Chen et al. Synthesis and characterizatioon of (h01) oriented high-silica zeolite beta membrane, Microporous and Mesoporous Materials, 124 (2009), pp. 8-14.*
Japanese office action in JP 2010-283166, dated Apr. 1, 2014 along with an english translation thereof.
Japanese office action in JP 2010-283167, dated Apr. 15, 2014 along with an english translation thereof.
China Office Action in CN 201080058492, dated Nov. 5, 2013 along with an english translation thereof.
Dr. R. Kumar et al., "Synthesis of Iron-Silicate Analogs of Zeolite Beta", "Zeolites", vol. 10., Feb. 1990, pp. 85-89.
Ramesh B. Borade et al., "Iron-Substituted Beta Molecular sieve: synthesis and characterization ", Microporous Materials, vol. 2., 1994, pp. 167-177.
Dr. P. Caullet et al., "Synthesis of zeolite Beta from nonalkaline fluoride aqueous aluminosilicate gels", "Zeolites", vol. 12., Mar. 1992, pp. 240-251.
J. Perez-Ramirez et al., "Evolution of Isomorphously substituted iron zeolites during activation: comparison of Fe-beta and Fe-ZSM-5", "Journal of Catalysis", vol. 232. www.sciencedirect.com, May 5, 2005, pp. 318-334.
Search report from International Application No. PCT/JP2010/072966, mail date is Apr. 5, 2011.
China Office action in CN 201080058492.X, dated Jul. 10, 2014 along with an english translation thereof.

* cited by examiner

METALLOSILICATES, PROCESSES FOR PRODUCING THE SAME, NITROGEN OXIDE REMOVAL CATALYST, PROCESS FOR PRODUCING THE SAME, AND METHOD FOR REMOVING NITROGEN OXIDE WITH THE SAME

TECHNICAL FIELD

The present invention relates to a novel metallosilicate which is useful as a catalyst, adsorbent, separation agent, etc., and to a process for producing the metallosilicate. More particularly, the invention relates to a β-type iron silicate in which iron that functions as solid-acid sites and is capable of functioning as catalytically active sites, adsorption sites, or the like is contained in a highly dispersed state in the crystals in a far larger amount than conventionally known amounts and which has high heat resistance and is highly crystalline, and to a process for producing the iron silicate.

The invention further relates to a novel metallosilicate which is useful as a catalyst, adsorbent, separation agent, etc., and to a process for producing the metallosilicate. More particularly, the invention relates to a β-type iron silicate which is synthesized without using fluorine, which is difficult to use industrially, and contains aluminum serving as solid-acid sites and iron capable of functioning as catalytically active sites, adsorption sites, or the like, both the aluminum and the iron being contained in a highly dispersed state in the crystals, and which has high heat resistance and is highly crystalline, and to a process for producing the iron silicate.

Furthermore, the invention relates to the removal of nitrogen oxides emitted from internal combustion engines, and provides a nitrogen oxide removal catalyst constituted of a crystalline silicate having a β-structure, a process for producing the catalyst, and a method for nitrogen oxide removal in which the nitrogen oxides are reacted with at least one of ammonia, urea, and organic amines using the catalyst.

BACKGROUND ART

β-Type zeolites are high-silica zeolites which were disclosed first by patent document 1, and are in extensive use as catalysts, adsorbents, etc.

Before being utilized, zeolites are frequently modified chemically with metals for the purpose of imparting a specific function, e.g., catalytic activity or adsorption selectivity. Methods in general use include: a method in which metal cations are loaded into a zeolite by means of ion exchange in a liquid phase while utilizing the ability of the zeolite to undergo ion exchange; and a method in which a zeolite is impregnated with a solution containing a salt of a metal to thereby load the metal into the zeolite.

In chemical modification of a zeolite, it is generally desirable, from the standpoint of enabling the desired function to be exhibited to a highest degree, that the metal loaded should be present in the state of having been highly dispersed in the zeolite base and have aggregated as less as possible.

However, in the loading based on ion exchange described above, the amount of the metal which can undergo the exchange depends on the ion-exchange ability of the zeolite, and an attempt to load more than that is apt to result in metal aggregation. On the other hand, the loading through impregnation has a problem that metal aggregation becomes more apt to occur as the amount of the metal to be loaded is increased, although it is easy to control the amount of the metal to be loaded.

Some metals can be introduced into the zeolite framework like silicon and aluminum by adding the metals as a starting material for hydrothermal synthesis of a zeolite. According to this method, atoms of the metals being introduced are separately incorporated into the silicon network including oxygen atoms and, hence, the metals come into an exceedingly highly dispersed state. Known metals which can be introduced include B, Cr, V, Ge, Ga, Fe, Sn, Zn, and the like. A relatively large number of attempts to introduce iron, among these metals, have been made so far.

With respect to β-type iron silicates obtained by introducing iron into the framework of a β-type zeolite, the following prior-art techniques have been disclosed.

For example, patent document 2 discloses an adsorbent including a β-type iron silicate which has both aluminum and iron in the framework thereof. Patent document 3 discloses an adsorbent for automobile exhaust removal which includes a β-type iron silicate specified with, for example, the full width at half maximum of an X-ray diffraction peak. Moreover, patent document 4 discloses an aluminosilicate zeolite which contains both framework iron and iron cations present on the ion-exchange sites.

Furthermore, β-type iron silicates are disclosed also in, for example, non-patent document 1 and non-patent document 2. In addition, non-patent document 3 discloses a β-type iron silicate synthesized from starting materials into which fluorine had been added. It is generally known that by adding fluorine to starting materials in zeolite synthesis, a zeolite having fewer lattice defects and better crystallinity is obtained as compared with the case where fluorine is not added. For example, such techniques for a β-type zeolite are disclosed in non-patent document 4.

However, the β-type iron silicates disclosed in those documents are β-type iron silicates in which the amount of the introduced iron is relatively small or which contain a large amount of iron introduced but contain a large amount of aluminum that coexists within the crystals, or are β-type iron silicates which are presumed, from the disclosed crystalline form, to have undergone unsatisfactory crystal growth. The reasons for this are that in the hydrothermal synthesis of a general iron silicate, as the content of aluminum in the starting materials decreases, the range of starting-material compositions capable of crystal formation becomes narrower and the reaction comes to require an exceedingly prolonged period, as compared with the case of ordinary aluminosilicates. Namely, in the method of introducing iron through hydrothermal synthesis, it is difficult to introduce a large amount of iron while minimizing coexistence of aluminum, although iron can be introduced in a highly dispersed state.

Meanwhile, industrial use of fluorine in zeolite synthesis is difficult from the standpoints of corrosion of the equipment, etc. Furthermore, use of fluorine is undesirable because there is a possibility that the fluorine remaining in the zeolite yielded might adversely affect the performance.

However, in the field of applications such as catalysts or adsorbents, there has been no known β-type iron silicate having high heat resistance and high crystallinity in which iron that functions as solid-acid sites and is capable of functioning as catalytically active sites, adsorption sites, or the like is contained in a highly dispersed state in the crystals in a far larger amount than conventionally known amounts and which has been synthesized without using fluorine, which is difficult to use industrially.

The β-type iron silicates disclosed in those documents are β-type iron silicates in which the amount of the introduced iron is extremely small and, hence, the iron is not always sufficient for use as active sites in catalysts, etc., or are β-type iron silicates which have insufficient crystallinity although aluminum and iron have been introduced in sufficient amounts. The reason for this is as follows. In the hydrothermal synthesis of an aluminum-containing iron silicate, there generally is the following tendency. As the iron content of the starting materials decreases, the properties of the product become more akin to the properties of ordinary aluminosilicates, so that crystallization becomes easier and, simultaneously therewith, crystals having better crystallinity are obtained. In contrast, as the iron content of the starting materials is increased, the region for crystal formation decreases rapidly and crystals having reduced crystallinity are obtained. Such tendency is thought to be attributable to the instability of the iron as compared with the aluminum in the alkaline starting-material mixture and to the enhanced crystal distortion due to the presence of iron, which has a larger ionic radius than aluminum, in the zeolite framework.

Nitrogen oxide removal catalysts constituted of a crystalline silicate which has a β-type structure including iron and has an $SiO_2/Fe_2O_3$ ratio of 20-300 and in which the proportion of isolated iron ions in the iron contained is 80% or more (patent document 5) have been reported. In these catalysts, however, the crystalline silicate has been made to have an increased crystal grain diameter and enhanced crystallinity by using a fluorine source.

It has also been reported that crystalline silicates which have a β-type framework structure including iron and which have an $SiO_2/Fe_2O_3$ molar ratio of 20-300 and a $\log(SiO_2/Al_2O_3)$ value of 2 or more (molar ratio) have the excellent ability to decompose nitrogen oxides at low temperatures and excellent hydrothermal durability (patent document 6). However, these crystalline silicates also have a grain diameter as large as 5 μm or more.

There has so far been no known β-type iron silicate having high heat resistance and high crystallinity which is synthesized without using fluorine, which is difficult to use industrially, and contains aluminum serving as solid-acid sites and iron capable of functioning as catalytically active sites or adsorption sites or the like, both the aluminum and the iron being contained in a highly dispersed state in the crystals, and which has a grain diameter range that enables the silicate to be expected to show high dynamic performance when used as a catalyst.

Crystalline silicates in which an element of another kind has been substituted in the framework structure are expected to show properties different from those of ordinary aluminosilicate zeolites, and use of the crystalline silicates in catalytic reactions is being investigated. For example, disclosed techniques include a xylene isomerization catalyst which employs an iron silicate loaded with platinum (patent document 7), a catalyst for the selective methylation of naphthalenic compounds which employs an iron silicate (patent document 8), a process for polyalkylene glycol production using an iron silicate as a ring-opening polymerization catalyst for cyclic ethers (patent document 9), etc.

Meanwhile, investigations are being made also on techniques for removing nitrogen oxides using an iron silicate. For example, the following techniques have been reported: a catalyst for cleaning discharge gases containing nitrogen oxides, the catalyst including a ZSM-5 iron silicate into which a coprecipitated composite oxide of copper and gallium has been dispersedly loaded (patent document 10); a method for removing nitrogen oxides in which a ZSM-5 iron silicate that has been ion-exchanged with an alkali metal is brought into contact with a discharge gas containing nitrogen oxides, in an atmosphere containing excess oxygen in the presence of a hydrocarbon or an oxygen-containing compound (patent document 11); a method for removing nitrogen oxides in which a discharged combustion gas that contains nitrogen oxides, oxygen gas, and optionally sulfurous acid gas is catalytically reacted in the presence of an iron silicate catalyst and a hydrocarbon as a reducing agent (patent document 12); and a discharge gas removal catalyst for mainly removing nitrogen oxides, the catalyst having been obtained by loading at least one of platinum, palladium, rhodium, and cobalt into an iron silicate (patent document 13). Incidentally, the iron silicates described in patent documents 12 and 13 each are considered to have a ZSM-5 framework structure because the iron silicates were obtained using a tetrapropylammonium salt in the synthesis thereof.

With respect to catalysts for removing nitrous oxide, the following techniques have, for example, been disclosed: a process for producing a catalyst which includes a β-type iron silicate loaded with copper, cobalt, or the like and which is for use in direct decomposition of nitrous oxide (patent document 14); a method in which an iron silicate having a β-structure is used to directly decompose nitrous oxide; and a method in which carbon monoxide is used as a reducing agent to catalytically and non-selectively reduce nitrous oxide (non-patent document 3).

Meanwhile, with respect to catalysts for removing nitrogen oxides contained in discharge gases, a method is known in which an aluminosilicate zeolite catalyst loaded with iron or copper is used to conduct selective catalytic reduction (generally called SCR) with ammonia for the purpose of removing the nitrogen oxides contained in an exhaust gas containing oxygen in excess, which is represented by lean-burn exhaust gas and diesel exhaust gas (patent document 15).

Nitrogen oxide removal catalysts constituted of a crystalline silicate which has a β-type structure including iron and has an $SiO_2/Fe_2O_3$ ratio of 20-300 and in which the proportion of isolated iron ions in the iron contained is 80% or more (patent document 5) have been reported. However, when used in a method for reducing nitrogen oxides ($NO_x$) using ammonia as a reducing agent, these catalysts were insufficient in the ability to decompose nitrogen oxides at low temperatures and in hydrothermal durability.

Furthermore, it has been reported that crystalline silicates which have a β-type framework structure including iron and which have an $SiO_2/Fe_2O_3$ molar ratio of 20-300 and a $\log(SiO_2/Al_2O_3)$ value of 2 or more (molar ratio) have the excellent ability to decompose nitrogen oxides at low temperatures and excellent hydrothermal durability (patent document 6). However, these crystalline silicates have a crystal grain diameter as large as 5 μm or more, and still have a problem concerning handling, such as coating, molding, etc.

PRIOR-ART DOCUMENTS

Patent Documents

Patent Document 1: U.S. Pat. No. 3,308,069
Patent Document 2: Japanese Patent No. 4044984
Patent Document 3: Japanese Patent No. 3986186
Patent Document 4: U.S. Patent Application Publication No. 2009-048095

Patent Document 5: JP-A-2009-166031
Patent Document 6: JP-A-2009-166032
Patent Document 7: Japanese Patent No. 3269828
Patent Document 8: JP-T-2004-524142
Patent Document 9: Japanese Patent No. 3477799
Patent Document 10: JP-A-5-305240
Patent Document 11: Japanese Patent No. 2691643
Patent Document 12: JP-A-5-154349
Patent Document 13: Japanese Patent No. 2605956
Patent Document 14: U.S. Patent Application Publication No. 2006-0088469
Patent Document 15: JP-A-2-293021

Non-Patent Documents

Non-Patent Document 1: ZEOLITES, Vol. 10 (1990), pp. 85-89
Non-Patent Document 2: Microporous Materials, Vol. 2 (1994), pp. 167-177
Non-Patent Document 3: Journal of Catalysis, Vol. 232 (2005), pp. 318-334
Non-Patent Document 4: ZEOLITES, Vol. 12 (1992), pp. 240-250

SUMMARY OF THE INVENTION

Problems that the Invention is to Solve

An object of the invention is to provide a highly crystalline p-type iron silicate which contains active iron introduced in a large amount into the crystal lattice and which has high heat resistance, and to provide a process for producing the iron silicate.

Another object of the invention is to provide a highly crystalline β-type iron silicate which is synthesized without using fluorine, which is difficult to use industrially, and which has a fluorine content of 400 ppm or less and contains both aluminum and iron, and to provide a process for producing the iron silicate.

Although it is desired to efficiently remove nitrogen oxides from discharge gases, no nitrogen oxide removal catalyst which is highly active in the removal of nitrogen oxides at a low temperature of 200° C. or below and has high hydrothermal durability and which has excellent handleability has been obtained so far.

A further object of the invention is to provide a crystalline silicate catalyst which has a catalytic performance for efficiently removing nitrogen oxides in a wide temperature range, in particular, a range of relatively low temperatures of 200° C. and lower, and hydrothermal durability and which further has excellent handleability, and to provide a process for producing the catalyst. Still a further object is to provide a method for removing nitrogen oxides using the catalyst.

Means for Solving the Problems

Under the circumstances described above, the present inventors diligently made investigations on processes for producing a β-type iron silicate and on production conditions therefor. As a result, the inventors have found the β-type iron silicates of the invention.

Essential points of the invention reside in the following (1) to (17).
(1) A β-type iron silicate characterized in that the iron silicate has a fluorine content not more than 400 ppm by weight of the dry crystals, that the crystal grains have a truncated square bipyramidal morphology in an examination with a scanning electron microscope, and that the whole or part of the iron is contained in the β-type framework structure.
(2) The β-type iron silicate according to (1) which is characterized by preferably having an $SiO_2/Al_2O_3$ (molar ratio) of 300 or more and containing iron in an amount of 5.5% by weight or more based on the dry weight of the crystals.
(3) A process for producing the β-type iron silicate according to (1) or (2), characterized by hydrothermally crystallizing the following starting-material composition

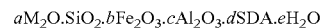
$aM_2O \cdot SiO_2 \cdot bFe_2O_3 \cdot cAl_2O_3 \cdot dSDA \cdot eH_2O$ (M represents $Na^+$ or $K^+$, SDA represents a structure-directing agent, and a, b, c, d, and e respectively indicate the molar ratios of the $M_2O$, $Fe_2O_3$, $Al_2O_3$, SDA, and $H_2O$ to the $SiO_2$),
wherein the ($SDA/SiO_2$) molar ratio (d) is 0.10-0.35.
(4) The process for producing a β-type iron silicate according to (3) which is characterized in that the starting-material composition described in (3) preferably satisfies the following.
  a=0.075 to 0.50
  b=0.01 to 0.05
  c=0.01 or less
  e=7 to 15
(5) A β-type iron silicate which has an $SiO_2/Fe_2O_3$ molar ratio of 50-150, a fluorine content not more than 400 ppm by weight of the dry crystals, and a full width at half maximum (FWHM) of the crystal diffraction (302) plane of 0.16-0.24° and in which the whole or part of the iron is contained in the β-type framework structure.
(6) The β-type iron silicate according to (5) which preferably has an $SiO_2/Al_2O_3$ molar ratio of 25-70.
(7) The β-type iron silicate according to (5) or (6) which preferably has a crystal grain diameter of 0.2-2.0 μm.
(8) The β-type iron silicate according to any one of (5) to (7) which preferably has a crystal grain diameter of 0.2-1.0 μm.
(9) A process for producing the β-type iron silicate according to any one of (5) to (8) in which the following starting-material composition which contains no fluorine

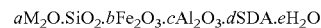
$aM_2O \cdot SiO_2 \cdot bFe_2O_3 \cdot cAl_2O_3 \cdot dSDA \cdot eH_2O$ wherein
  M=$K^+$ or $Rb^+$ or $Cs^+$
  a=0.005 to 0.10
  b=0.006 to 0.02
  c=0.014 to 0.04
  d=0.10 to 0.35
  e=7 to 15
is hydrothermally treated and thereby crystallized.
(10) A nitrogen oxide removal catalyst which comprises a β-type iron silicate characterized by having iron and aluminum in the β-type framework structure, having an $SiO_2/Al_2O_3$ molar ratio of 20-70 and an $SiO_2/Fe_2O_3$ molar ratio of 50-200, and having a full width at half maximum (FWHM) of the crystal diffraction (302) plane of 0.30-0.40°.
(11) The nitrogen oxide removal catalyst according to (10) which preferably has an average crystal grain diameter of 0.2-2.0 μm.
(12) The nitrogen oxide removal catalyst according to (10) which preferably has an average crystal grain diameter of 0.2-1.0 μm.
(13) The nitrogen oxide removal catalyst according to any one of (10) to (12) which preferably has an $SiO_2/Fe_2O_3$ molar ratio of 100-200.

(14) A process for producing the nitrogen oxide removal catalyst according to any one of (10) to (13), characterized by heat-treating a β-type iron silicate at 700-850° C. in an atmosphere having a water vapor concentration of 5% by volume or less, the β-type iron silicate having been obtained by crystallization from a liquid reaction mixture containing silica, aluminum, iron, and an organic structure-directing agent.

(15) The process for producing a nitrogen oxide removal catalyst according to (14) wherein the atmosphere preferably has a water vapor concentration of 1% by volume or less.

(16) The process for producing a nitrogen oxide removal catalyst according to (14) or (15) wherein in the calcination at 700-850° C., the β-type iron silicate is held preferably for 1 hour or more.

(17) A method for reducing a nitrogen oxide, the method including using the nitrogen oxide removal catalyst according to any one of (10) to (13).

Effects of the Invention

The β-type iron silicate of the invention according to (1) and (2) above contains a large amount of active iron in the crystal lattice and, despite this, has high crystallinity. For example, the β-type iron silicate undergoes no decrease in crystallinity at all even when subjected to a 900° C. endurance treatment, and still show a high degree of crystallinity even after a 1,000° C. endurance treatment. This β-type iron silicate hence can be used as a catalyst or adsorbent to be used at high temperatures.

The β-type iron silicate of the invention according to (5) to (8) above has been synthesized without using fluorine, which is difficult to use industrially, and has high crystallinity and contains iron in the crystal lattice. This β-type iron silicate has high heat resistance when the silicate has a crystal grain diameter as small as 2.0 μm or less.

The nitrogen oxide removal catalyst of the invention has the high ability to remove nitrogen oxides, and is capable of efficiently removing nitrogen oxides in a wide temperature range, in particular, at low temperatures of 200° C. and lower. The catalyst further has excellent durability and retains the high catalytic activity even after an endurance treatment.

MODES FOR CARRYING OUT THE INVENTION

The β-type iron silicates of the invention are explained below.

First, explanations are made on the β-type iron silicate of the invention described under (1) and (2) above and the process described under (3) and (4) above for producing the β-type iron silicate of the invention.

This β-type iron silicate of the invention is synthesized from starting materials including no fluorine, and has a fluorine content not more than 400 ppm by weight of the dry crystals. In β-type iron silicates synthesized using fluorine, fluorine remains therein even after the iron silicates have undergone calcination for removing the structure-directing agent (hereinafter referred to as "SDA"). The fluorine content of the β-type iron silicate crystals of the invention is preferably not more than 200 ppm by weight, more preferably not more than 100 ppm by weight, of the dry crystals. It is even more preferred that the fluorine content thereof should be not higher than a detection limit.

The content of fluorine in a β-type iron silicate can be determined by lanthanum-alizarin complexone absorptiometry. As a lanthanum-alizarin complexone, use can be made of commercial Alfusone (Dojindo Laboratories). In the analysis, a pretreatment is conducted in which a sample is subjected to dissolution with an alkali, concentration, and distillation. Subsequently, Alfusone is added thereto, and the pH of the resultant mixture is adjusted. The resultant mixture is examined for absorbance at a wavelength of 620 nm.

In the β-type iron silicate of the invention, the primary particles of the crystals, when examined with a scanning electron microscope, show a crystalline form of a truncated square bipyramidal morphology.

Hydrothermally synthesized β-type zeolite crystals generally are apt to be obtained as aggregates of primary particles which have an irregular spherical to ellipsoidal shape of about 0.1-1.0 μm. On the other hand, primary particles of satisfactorily grown β-type zeolite crystals are known to show a truncated square bipyramidal morphology. An example of such crystalline form of a β-type zeolite is shown, for example, in non-patent document 4.

Figure 1:
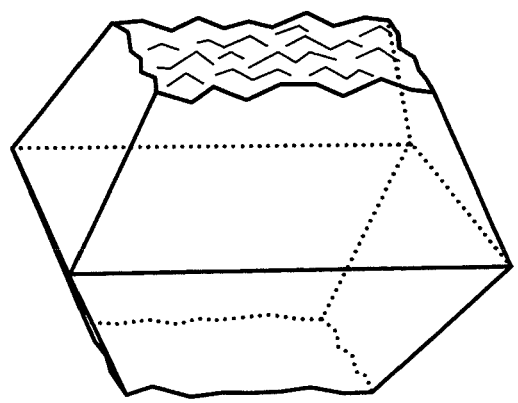
FIG. 1 is a diagrammatic view which shows the crystalline form of a primary particle of a β-type iron silicate of the invention.

The crystal grains of the β-type iron silicate of the invention contain iron in a large amount and, despite this, show the same crystalline form as satisfactorily grown β-type zeolite crystals. The crystalline form thereof has distinct ridge lines and shows a truncated square bipyramidal morphology, as shown diagrammatically in FIG. 1. Such a shape can be ascertained in an examination with a scanning electron microscope.

The aspect ratio of this crystalline form (the aspect ratio being defined as the ratio of the length of each of the sides constituting the basal plane of the square bipyramidal shape to the length of the crystal axis which is perpendicular to the basal plane) can vary depending on the composition of starting materials and synthesis conditions including reaction temperature and reaction time.

The crystal grains of the β-type iron silicate of the invention may include twins each configured of two or more crystal grains or may partly include grains of a crystalline form which is in the course of growth, depending on synthesis conditions. It is preferred that when the β-type iron silicate of the invention is examined with a scanning electron microscope at such a magnification that a sufficiently large number of crystal grains can be observed, at least 30% by number of the crystal grains present in the field of view should be accounted for by satisfactorily grown crystals which may include twins. The proportion of such satisfactorily grown crystals is especially preferably 40% or more, even more preferably 50% or more.

The magnification in this examination is, for example, about 5,000-20,000 diameters, and it is preferred to employ conditions under which at least 100 crystal grains are within the field of view. The conditions of the examination with a scanning electron microscope are not particularly limited so long as the shapes of the crystal grains can be clearly observed and the number thereof can be clearly counted.

It is thought that the iron which is present in the framework of a β-type iron silicate is in an isolated state and has a highly symmetrical tetrahedral structure, while the iron present outside the framework has an octahedral structure. Consequently, the presence of iron in the framework of the β-type iron silicate of the invention can be ascertained by electron spin resonance spectroscopy; resonance absorption at indicates the presence thereof. The iron in the β-type iron silicate framework can be ascertained by electron spin resonance spectroscopy (measurement temperature, 77 K).

Paramagentic iron ions ($Fe^{3+}$) show resonance absorption in electron spin resonance spectroscopy, and it is known that there are at least three absorption peaks at g≈4.3, and g≈4.3 which are assigned to the iron ions (see, for example, *Journal of Catalysis*, 249 (2007) 67). Iron ions which show an absorption peak at g≈2.0 are assigned to isolated iron ions having a symmetrical tetrahedral structure (or a highly symmetrical multi-coordinate structure), while iron ions which show absorption at g≈4.3 and g>4.3 are assigned to isolated iron ions having a distorted tetrahedral structure and a distorted multi-coordinate structure.

Electron spin resonance spectroscopy can be conducted by a general method.

For example, an electron spin resonance apparatus (JES-TE200, manufactured by JEOL Ltd.) can be used, and the measurement conditions can include a measurement temperature of 77 K, a microwave output of 1.0 mW, an observation range of 0-1,000 mT, a modulation width of 0.32 mT, and a time constant of 0.3 sec. About 10 mg of a sample is weighed out and placed in a sample tube made of quartz, and this sample tube is inserted into a Dewar vessel for measurement at liquid-nitrogen temperature. Thereafter, a measurement can be made.

The presence of iron in the framework of a β-type iron silicate can be ascertained also by analyzing an X-ray absorption spectrum (XAFS). In this case, the pre-edge peak (7,110 eV) which appears before the K absorption edge for iron is assigned to the isolated iron ions of a tetrahedral structure.

The β-type iron silicate of the invention has a structure in which the whole or part of the iron atoms contained therein have been linked, as the framework atoms of tetra-coordinate structures, to oxygen atoms, and has the properties of a solid acid which are attributable to a charge deficiency in the silicate framework as in aluminosilicate zeolites. The iron contained in the β-type iron silicate of the invention need not be wholly present in the framework. This is because the iron which is present in the framework can be partly departed by a heat treatment such as, for example, the calcination operation for removing the SDA.

The β-type iron silicate of the invention has a composition represented by

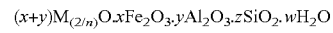

(wherein n indicates the valence of the cation M; x, y, and z respectively indicate the molar fractions of the $Fe_2O_3$, $Al_2O_3$, and $SiO_2$; x+y+z=1; w is a number of 0 or larger; z/y preferably is 300 or larger, although not particularly limited; and y may be 0).

The crystal structure of the β-type iron silicate of the invention is of the β-type in terms of crystal structure determined through X-ray diffraction. A β-type iron silicate is a metallosilicate having a three-dimensional pore system configured of pores of 0.76×0.64 nm and of 0.55×0.55 nm which are constituted of 12-membered oxygen rings and which intersect with one another. A β-type iron silicate shows an X-ray diffraction pattern which is characterized by the lattice spacings d (angstroms) and diffraction intensities therefor which are shown in the following Table 1.

TABLE 1

| Lattice spacing d (Å) | Peak intensity |
| --- | --- |
| 11.5 ± 0.4 | medium to high |
| 7.4 ± 0.2 | low |
| 6.6 ± 0.15 | low |
| 4.15 ± 0.10 | low |
| 3.97 ± 0.10 | extremely high |
| 3.3 ± 0.07 | low |
| 3.0 ± 0.07 | low |
| 2.05 ± 0.05 | low |

It is preferred that the β-type iron silicate of the invention should have a composition having a value of $SiO_2/Al_2O_3$ of 300 or more. In the case where iron is incorporated in a large amount, this β-type iron silicate having a small value of $SiO_2/Al_2O_3$ is relatively easily crystallized. However, it is difficult to obtain a highly crystalline β-type iron silicate therefrom. According to the β-type iron silicate of the invention, even when the iron silicate has a high value of $SiO_2/Al_2O_3$, highly crystalline crystal grains are obtained without using an SDA in excess. The $SiO_2/Al_2O_3$ value of the composition of the β-type iron silicate of the invention is preferably 400 or more, more preferably 500 or more.

It is preferred that the β-type iron silicate of the invention should contain iron in an amount of at least 5.5% by weight or more based on the dry weight of the crystals. The term "dry weight of the crystals" means the total weight of the oxides of all elements constituting the crystals. Specifically, that term means an ignited-crystal weight, which is the weight of the crystals that have been heat-treated at 600° C. for 30 minutes in air. The expression "iron in amount of 5.5% by weight or more" means that the amount of the iron in terms of elemental iron is 5.5% by weight or more.

The β-type iron silicate of the invention contains iron in a highly dispersed state and, despite this, has a satisfactorily grown crystalline form, i.e., highly excellent crystallinity. The content of iron is preferably 5.5% by weight or more, more preferably 6.5% by weight or more. On the other hand, in the case where the content of iron exceeds 12% by weight, it becomes difficult to crystallize the β-type iron silicate. Consequently, the upper limit of the content of iron in the β-type iron silicate of the invention is 12% by weight.

In general, in the case where a zeolite is to be modified by loading iron thereinto, it is preferred to load iron in a minimal amount. The reason for this is as follows. In the case where a zeolite loaded with iron is to be utilized as a catalyst, adsorbent, or the like, it is desirable that the iron, which is an active component, should be supported in a highly dispersed state within the zeolite. However, when iron is to be introduced into a zeolite in a large amount by a modification technique such as ion exchange or impregnation loading, iron aggregation occurs, making it impossible to sufficiently impart the desired function. Because of this problem, the amount of iron to be introduced had have to be limited in order to enable the function of the zeolite loaded with iron to be exhibited to the highest degree.

When iron is introduced into a zeolite through hydrothermal synthesis, it is difficult to introduce a large amount of iron. This is because in the alkaline starting-material mixture, the iron salts which are usually used as a starting material are apt to form insoluble oxyhydroxides, or the like and are not in a state that is suitable for incorporation of the iron into zeolite crystals. As the amount of iron in the fed starting materials increases, the amount of such oxyhydroxides, or the like increases.

Meanwhile, it is possible to introduce a large amount of iron into a zeolite through hydrothermal synthesis by using an expensive SDA in an excess amount which is far larger than ordinary amounts or by causing aluminum to coexist in the starting materials. However, this method does not yield crystals which are in a satisfactorily grown state and have excellent crystallinity. In addition, since zeolites in which aluminum coexists generally show reduced hydrothermal durability of the crystals, it is desirable that the amount of coexistent aluminum should be as small as possible.

Although the β-type iron silicate of the invention has a large amount of active iron contained in the crystal lattice, the iron silicate has high crystallinity. For example, the β-type iron silicate undergoes no decrease in crystallinity at all even when subjected to a 900° C. endurance treatment, and still shows a high degree of crystallinity even after a 1,000° C. endurance treatment. The β-type iron silicate hence can be used as a catalyst or adsorbent to be used at high temperatures.

Next, a process for producing this β-type iron silicate of the invention is explained.

An example of the composition of a mixture of fed starting materials for the β-type iron silicate of the invention is as follows. However, it is essential that the value of d, among the content ranges, should be in the range of 0.10-0.35.

An ingredient which has the function of accelerating crystallization, such as, for example, seed crystals, may be added.

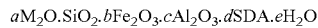

$a$M$_2$O.SiO$_2$.$b$Fe$_2$O$_3$.$c$Al$_2$O$_3$.$d$SDA.$e$H$_2$O

In the formula,
M=Na$^+$ or K$^+$,
a=0.075-0.50, preferably 0.10-0.25,
b=0.01-0.05, preferably 0.01-0.03,
c=0.01 or less, preferably 0.003 or less, more preferably 0.002 or less,
d=0.10-0.35, preferably 0.10-0.30,
e=7-15, preferably 9-13.

The M$_2$O is an essential constituent starting material in the production of the β-type iron silicate of the invention. M$_2$O increases the pH of the starting-material mixture and accelerates dissolution and crystallization of the starting materials containing iron. Furthermore, M$_2$O enables iron to be introduced in a larger proportion into the crystals to be yielded, because silicon dissolution is accelerated.

The proportion of M$_2$O to H$_2$O (a/e) in the feed-material composition is 0.008 or more, preferably 0.009 or more, more preferably 0.010 or more.

Figure 2:
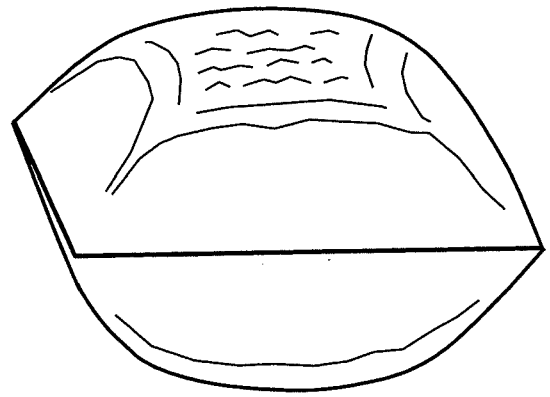
FIG. 2 is a diagrammatic view which shows a hill-shaped crystalline form of a β-type iron silicate, the crystalline form being outside the range according to the invention and having insufficiently formed ridge lines.

Too large SDA amounts are undesirable because a hill-shaped crystalline form having insufficiently formed ridge lines is apt to be obtained. This is thought to be because a large SDA amount renders the function of the M$_2$O, which serves as an alkali source, relatively weak to change the mechanism in which crystals undergo a dissolution/precipitation cycle in the course of crystal growth. An example of such crystals is diagrammatically shown in FIG. 2.

The starting materials for synthesis are configured of a silicon source, an iron source, an SDA, an alkali metal source, and water. Although addition of aluminum is not required, aluminum can come as an impurity contained in starting materials. It is therefore preferred to use starting materials for synthesis which contain aluminum as little as possible.

As the silicon source, use can be made of colloidal silica, amorphous silica, sodium silicate, tetraethyl orthosilicate, iron silicate gel, or the like. As the iron source, use can be made of iron nitrate, iron chloride, iron sulfate, metallic iron, or the like. These starting materials preferably are materials which can be sufficiently evenly mixed with other ingredients.

As the SDA material, use can be made of one or more compounds selected from the group consisting of compounds having a tetraethylammonium cation, such as tetraethylammonium hydroxide (hereinafter referred to as "TEAOH"), and tetraethylammonium bromide, and compounds having an octamethylenebisquinuclidine, α,α'-diquinuclidinyl-p-xylene, α,α'-diquinuclidinyl-m-xylene, α,α'-diquinuclidinyl-o-xylene, 1,4-diazabicyclo[2,2,2]octane, 1,3,3,N,N-pentamethyl-6-azonium bicyclo[3,2,1]octane, or N,N-diethyl-1,3,3-trimethyl-6-azonium bicyclo[3,2,1] octane cation.

As the alkali metal source, use can be made of sodium hydroxide, sodium sulfate, sodium chloride, sodium acetate, potassium hydroxide, potassium sulfate, potassium chloride, potassium acetate, or the like. These starting materials preferably are materials which can be sufficiently evenly mixed with other ingredients.

A starting-material mixture of water, a silicon source, an iron source, an SDA, and an alkali metal source is crystallized at a temperature of 100-180° C. in a closed-type pressure vessel. Thus, a β-type iron silicate according to the invention can be obtained.

During the crystallization, the starting-material mixture may be kept being mixed and stirred or may be kept standing still. After completion of the crystallization, the mixture is allowed to cool sufficiently and subjected to solid-liquid separation, and the solid matter is washed with a sufficient amount of pure water and dried at a temperature of 110-150° C. Thus, a β-type iron silicate according to the invention is obtained.

For removing the SDA, use can be made of a liquid-phase treatment in which an acidic solution or a liquid chemical containing an SDA-decomposing ingredient is used, an exchange treatment in which a resin or the like is used, or a pyrolysis treatment. A combination of these treatments may also be used. Furthermore, the β-type iron silicate can be used after having been converted to the hydrogen form or the NH$_4$ form while utilizing the ion-exchange ability thereof.

Since a large amount of iron in a highly dispersed state is contained in the β-type iron silicate of the invention, this iron silicate as such can be used as a catalyst, an adsorbent, or the like. Applications thereof are not particularly limited.

Active metal species may be further loaded into the β-type iron silicate of the invention. The metal species that can be loaded are not particularly limited.

For loading metals, use can be made of methods such as an ion-exchange method, impregnation loading method, evaporation-to-dryness method, precipitation loading method, and physical mixing method. Starting materials such as, for example, nitrates, sulfates, acetates, chlorides, complex salts, oxides, and composite oxides can be used in the metal loading.

The amount of a metal to be loaded is not limited. However, the amount thereof is especially preferably in the range of 0.1-10% by weight.

The β-type iron silicate of the invention can be used after having been mixed with a binder, such as silica, alumina, a clay mineral, etc., and molded. Examples of the clay mineral for use in the molding include kaolin, attapulgite, montmorillonite, bentonite, allophane, and sepiolite. It is also possible to use the β-type iron silicate after having been applied as a wash coat to a honeycomb base made of either cordierite or a metal.

Next, explanations are given on the β-type iron silicate of the invention described under (5) to (8) above and the process described under (9) above for producing the β-type iron silicate of the invention.

This β-type iron silicate of the invention has a composition represented by

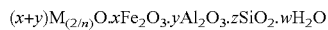

$(x+y)M_{(2/n)}O \cdot xFe_2O_3 \cdot yAl_2O_3 \cdot zSiO_2 \cdot wH_2O$ (wherein n indicates the valence of the cation M; x, y, and z respectively indicate the molar fractions of the $Fe_2O_3$, $Al_2O_3$, and $SiO_2$; x+y+z=1; and w is a number of 0 or larger).

The crystal structure of the β-type iron silicate of the invention is of the β-type in terms of crystal structure determined through X-ray diffraction. A β-type iron silicate is a metallosilicate having a three-dimensional pore system configured of pores of 0.76×0.64 nm and of 0.55×0.55 nm which are constituted of 12-membered oxygen rings and which intersect with one another. A β-type iron silicate shows an X-ray diffraction pattern which is characterized by the lattice spacings d (angstroms) and diffraction intensities therefor which are shown in Table 1 given above.

The β-type iron silicate of the invention has a structure in which the whole or part of the iron atoms contained therein have been linked, as the framework atoms of tetra-coordinate structures, to oxygen atoms, and has the properties of a solid acid which are attributable to a charge deficiency in the silicate framework as in aluminosilicate zeolites. The iron contained in the β-type iron silicate of the invention need not be wholly present in the framework. This is because the iron which is present in the framework can be partly departed by a heat treatment such as, for example, the calcination operation for removing the SDA.

The β-type iron silicate of the invention has a composition having a value of $SiO_2/Fe_2O_3$ of 50-150. In the case where the value of $SiO_2/Fe_2O_3$ decreases below 50, crystallization of the β-type structure gradually becomes difficult, resulting in a decrease in crystallinity. In the case where the value of $SiO_2/Fe_2O_3$ exceeds 150, the absolute amount of iron becomes small, leading to a decrease in catalytic activity, etc. From the standpoint of crystallinity, the value of $SiO_2/Fe_2O_3$ is preferably 100-150, more preferably 130-150.

Aluminum and iron are both introduced into the zeolite framework so as to form a tetra-coordinate structure. Consequently, crystallization is controlled by regulating not only the proportion of each of aluminum and iron but also the total introduction amount of both. Namely, the β-type iron silicate of the invention has a value of $SiO_2/(Al_2O_3+Fe_2O_3)$ of 20-70. From the standpoint of crystallinity, the value thereof is preferably 25-70, more preferably 30-70.

The β-type iron silicate of the invention is synthesized from starting materials including no fluorine, and has a fluorine content not more than 400 ppm by weight of the dry crystals. In β-type iron silicates synthesized using fluorine, fluorine remains therein even after the iron silicates have undergone calcination for removing the SDA. The fluorine content of the β-type iron silicate crystals of the invention is preferably not more than 200 ppm by weight, more preferably not more than 100 ppm by weight, of the dry crystals. It is even more preferred that the fluorine content thereof should be not higher than a detection limit.

The content of fluorine in a β-type iron silicate can be determined, for example, by lanthanum-alizarin complexone absorptiometry. As a lanthanum-alizarin complexone, use can be made of commercial Alfusone (Dojindo Laboratories). In the analysis, a pretreatment is conducted in which a sample is subjected to dissolution with an alkali, concentration, and distillation. Subsequently, Alfusone is added thereto, and the pH of the resultant mixture is adjusted. The resultant mixture is examined for absorbance at a wavelength of 620 nm.

The β-type iron silicate of the invention has a full width at half maximum (FWHM) of the X-ray crystal diffraction (302) plane of 0.16-0.24°.

Incidentally, an examination by X-ray crystal diffractometry is made on the β-type iron silicate which has been synthesized and is in the state of containing the SDA. The full width at half maximum (FWHM) is an index to the state of the crystals, and indicates the regularity of the crystals and the degree of distortion of the lattice. The smaller the value thereof, the longer the period of the structure possessed by the crystals and the higher the crystallinity thereof. Crystals having a full width at half maximum exceeding 0.24° have insufficient crystallinity and are apt to suffer disintegration of the crystal structure upon a high-temperature hydrothermal treatment, etc.

In the β-type iron silicate of the invention, the whole or part of the iron is contained in the β-type framework structure. The presence of iron in the framework of the β-type iron silicate can be ascertained by electron spin resonance spectroscopy (measurement temperature, 77 K).

Paramagentic iron ions ($Fe^{3+}$) show resonance absorption in electron spin resonance spectroscopy, and it is known that there are at least three absorption peaks at g≈2.0, g≈4.3, and g>4.3 which are assigned to the iron ions (see, for example, *Journal of Catalysis*, 249 (2007) 67). Iron ions which show an absorption peak at g≈2.0 are assigned to isolated iron ions having a symmetrical tetrahedral structure (or a highly symmetrical multi-coordinate structure), while iron ions which show absorption at g≈4.3 and g>4.3 are assigned to isolated iron ions having a distorted tetrahedral structure and a distorted multi-coordinate structure.

It is thought that the iron which is present in the framework of a silicate is in an isolated state and has a highly symmetrical tetrahedral structure, while the iron present outside the framework has an octahedral structure. Consequently, the presence of iron in the framework of the β-type iron silicate of the invention can be ascertained by electron spin resonance spectroscopy; resonance absorption at indicates the presence thereof.

Electron spin resonance spectroscopy can be conducted by a general method.

For example, an electron spin resonance apparatus (JES-TE200, manufactured by JEOL Ltd.) can be used, and the measurement conditions can include a measurement temperature of 77 K, a microwave output of 1.0 mW, an observation range of 0-1,000 mT, a modulation width of 0.32 mT, and a time constant of 0.3 sec. About 10 mg of a sample is weighed out and placed in a sample tube made of quartz, and this sample tube is inserted into a Dewar vessel for measurement at liquid-nitrogen temperature. Thereafter, a measurement is made.

The presence of iron in the framework of a β-type iron silicate can be ascertained also by analyzing an X-ray absorption spectrum (XAFS). In this case, the pre-edge peak (7,110 eV) which appears before the K absorption edge for iron is assigned to the isolated iron ions of a tetrahedral structure.

The β-type iron silicate of the invention is a so-called aluminosilicate, which contains aluminum. The aluminum in a zeolite is solid-acid sites and functions as adsorption sites or the like in catalytic reactions. Consequently, the aluminum is an essential element depending on the chemical species to be adsorbed or on the catalytic reaction to which the zeolite is to be applied. As the content of aluminum is reduced, the hydrothermal durability of the zeolite generally improves in the compensation for a gradual decrease in the function of the aluminum as solid-acid sites.

The term "hydrothermal durability of the zeolite" means the hydrothermal durability of the zeolite framework itself.

The β-type iron silicate of the invention sufficiently contains aluminum which serves as solid-acid sites and, despite this, the iron silicate is highly crystalline and has high hydrothermal durability.

The β-type iron silicate of the invention has a composition preferably having a value of $SiO_2/Al_2O_3$ of 25-70. In the case where the value of $SiO_2/Al_2O_3$ decreases below 25, crystallization of the β-type structure gradually becomes difficult, resulting in a decrease in crystallinity. In the case where the value of $SiO_2/Al_2O_3$ exceeds 70, an insufficient solid-acid amount results. From the standpoint of crystallinity, the value of $SiO_2/Al_2O_3$ is preferably 35-70, more preferably 45-70.

It is preferred that the β-type iron silicate of the invention should have a crystal grain diameter, as measured through an examination with an SEM, of 0.2-2.0 μm.

The term "crystal grain diameter" in the invention means an average crystal grain diameter, which is an arithmetic mean value obtained from the diameters of 50 primary particles measured through an examination with an SEM at a magnification of 15,000 diameters. Since some of the primary particles had an irregular shape, the length of the horizontal-direction maximum axis was measured equally with respect to each of all particles and taken as the diameter. Any desired magnification of the microscope can be selected so long as the magnification is suitable for the diameter measurement.

In the case where the crystal grain diameter thereof is less than 0.2 μm, this iron silicate has low hydrothermal durability. In the case where the crystal grain diameter thereof exceeds 2.0 μm, this iron silicate shows reduced dynamic performance when used as a catalyst especially at a high flow rate. Furthermore, grain diameters within the range according to the invention are preferred from the standpoint of handleability required for coating, molding, etc.

A process for producing this β-type iron silicate of the invention is explained below.

An example of the composition of a mixture of fed starting materials for the β-type iron silicate of the invention is as follows. However, the following content ranges are not restrictive, and the contents of the ingredients can be set at will so that the product to be finally yielded has a composition within the composition range for the β-type iron silicate of the invention. An ingredient which has the function of accelerating crystallization, such as, for example, seed crystals, may be added.

$$aM_2O \cdot SiO_2 \cdot bFe_2O_3 \cdot cAl_2O_3 \cdot dSDA \cdot eH_2O$$

In the formula,
M=$K^+$ or $R^{b+}$ or $Cs^+$,
a=0.005-0.10, preferably 0.01-0.05,
b=0.006-0.02, preferably 0.006-0.01,
c=0.014-0.04, preferably 0.014-0.028,
d=0.10-0.35, preferably 0.10-0.30,
e=7-15, preferably 9-13.

With respect to the $M_2O$, $Na^+$ is not contained therein although $Na^+$ is generally employed. The reason for this is as follows. The presence of $Na^+$ stabilizes the negatively charged aluminosilicate species present in a reaction solution to accelerate crystallization, but frequently brings about enhanced generation of crystal nuclei, resulting in a decrease in the size of the crystal grains. As a result, sufficient crystallinity is difficult to obtain.

The starting materials for synthesis are configured of a silicon source, an aluminum source, an iron source, an SDA, an alkali metal source, and water.

As the silicon source, use can be made of colloidal silica, amorphous silica, sodium silicate, tetraethyl orthosilicate, iron aluminosilicate gel, or the like. As the aluminum source, use can be made of aluminum sulfate, sodium aluminate, aluminum hydroxide, aluminum nitrate, aluminosilicate gel, metallic aluminum, or the like. As the iron source, use can be made of iron nitrate, iron chloride, iron sulfate, metallic iron, or the like. These starting materials preferably are materials which can be sufficiently evenly mixed with other ingredients.

As the SDA material, use can be made of one or more compounds selected from the group consisting of compounds having a tetraethylammonium cation, such as tetraethylammonium hydroxide (hereinafter referred to as "TEAOH") and tetraethylammonium bromide, and compounds having an octamethylenebisquinuclidine, α,α'-diquinuclidinyl-p-xylene, α,α'-diquinuclidinyl-m-xylene, α,α'-diquinuclidinyl-o-xylene, 1,4-diazabicyclo[2,2,2]octane, 1,3,3,N,N-pentamethyl-6-azonium bicyclo[3,2,1]octane, or N,N-diethyl-1,3,3-trimethyl-6-azonium bicyclo[3,2,1]octane cation.

As the alkali metal source, use can be made of potassium hydroxide, potassium sulfate, potassium chloride, potassium acetate, rubidium hydroxide, rubidium sulfate, rubidium chloride, rubidium acetate, cesium hydroxide, cesium sulfate, cesium chloride, cesium acetate, or the like. These starting materials preferably are materials which can be sufficiently evenly mixed with other ingredients.

A starting-material mixture of water, a silicon source, an aluminum source, an iron source, an SDA, and an alkali metal source is crystallized at a temperature of 100-180° C. in a closed-type pressure vessel. Thus, a β-type iron silicate according to the invention can be obtained.

During the crystallization, the starting-material mixture may be kept being mixed and stirred or may be kept standing still. After completion of the crystallization, the mixture is allowed to cool sufficiently and subjected to solid-liquid separation, and the solid matter is washed with a sufficient amount of pure water and dried at a temperature of 110-150° C. Thus, a β-type iron silicate according to the invention is obtained.

For removing the SDA, use can be made of a liquid-phase treatment in which an acidic solution or a liquid chemical containing an SDA-decomposing ingredient is used, an exchange treatment in which a resin or the like is used, or a pyrolysis treatment. A combination of these treatments may also be used. Furthermore, the β-type iron silicate can be used after having been converted to the hydrogen form or the NH₄ form while utilizing the ion-exchange ability thereof.

Since iron in a highly dispersed state is contained in the β-type iron silicate of the invention, this iron silicate as such can be used as a catalyst, an adsorbent, or the like. Applications thereof are not particularly limited.

Active metal species may be further loaded into the β-type iron silicate of the invention. The metal species that can be loaded are not particularly limited.

For the loading, use can be made of methods such as an ion-exchange method, impregnation loading method, evaporation-to-dryness method, precipitation loading method, and physical mixing method. Starting materials such as, for example, nitrates, sulfates, acetates, chlorides, complex salts, oxides, and composite oxides can be used in the metal loading.

The amount of a metal to be loaded is not limited. However, the amount thereof is especially preferably in the range of 0.1-10% by weight.

The β-type iron silicate of the invention can be used after having been mixed with a binder, such as silica, alumina, a clay mineral, etc., and molded. Examples of the clay mineral for use in the molding include kaolin, attapulgite, montmorillonite, bentonite, allophane, and sepiolite. It is also possible to use the β-type iron silicate after having been applied as a wash coat to a honeycomb base made of either cordierite or a metal.

The present inventors diligently made investigations on catalysts for the selective reduction of nitrogen oxides in which ammonia, for example, is used as a reducing agent. As a result, the inventors have found that a crystalline silicate which has an $SiO_2/Al_2O_3$ molar ratio of 20-70, preferably 20-60, an $SiO_2/Fe_2O_3$ molar ratio of 50-200, and a full width at half maximum (FWHM) of the crystal diffraction (302) plane of 0.30-0.40° and in which iron and aluminum are contained in the β-type framework structure shows the excellent ability to remove nitrogen oxides in the selective reduction of nitrogen oxides with ammonia or the like as a reducing agent, and further has such excellent nitrogen oxide removal ability that the crystalline silicate, after having undergone a hydrothermal endurance treatment at 700° C. for 20 hours in an atmosphere containing 10% by volume water vapor, has an $NO_X$ reduction percentage of 45-60% at a reaction temperature of 200° C. The invention has been thus completed.

Explanations are given below on the nitrogen oxide removal catalyst of the invention, the process for producing the catalyst, and the method for nitrogen oxide removal with the catalyst which were described under (10) to (17) above.

The nitrogen oxide removal catalyst of the invention is a β-type crystalline iron silicate (hereinafter referred to as "β-type iron silicate") which has iron and aluminum contained in the β-type framework structure and which has an $SiO_2/Al_2O_3$ molar ratio of 20-70, an $SiO_2/Fe_2O_3$ molar ratio of 50-200, and a full width at half maximum (FWHM) of the crystal diffraction (302) plane of 0.30-0.40°.

The expression "has iron and aluminum contained in the β-type framework structure" means not a state in which the whole iron is contained in the β-type framework structure but a state in which part of the iron is contained in the β-type framework structure and the remaining iron is not present as a constituent element of the β-type framework structure but is present around the ion-exchange sites that are not a component of the β-type framework structure or around the surface silanol groups.

The β-type iron silicate has a composition represented by

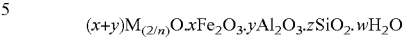

$(x+y)M_{(2/n)}O \cdot xFe_2O_3 \cdot yAl_2O_3 \cdot zSiO_2 \cdot wH_2O$ (wherein n indicates the valence of the cation M; x, y, and z respectively indicate the molar fractions of the $Fe_2O_3$, $Al_2O_3$, and $SiO_2$; x+y+z=1; and w is a number of 0 or larger).

The crystal structure of the β-type iron silicate which constitutes the nitrogen oxide removal catalyst of the invention is of the β-type in terms of crystal structure determined through X-ray diffraction. A β-type iron silicate is a metallosilicate having a three-dimensional pore system configured of pores of 0.76×0.64 nm and of 0.55×0.55 nm which are constituted of 12-membered oxygen rings and which intersect with one another. A β-type iron silicate shows an X-ray diffraction pattern which is characterized by the lattice spacings d (angstroms) and diffraction intensities therefor which are shown in Table 1 given above.

The β-type iron silicate constituting the nitrogen oxide removal catalyst of the invention has a structure in which the iron in tetra-coordinate structures has been linked, as framework atoms, to oxygen atoms, and has the properties of a solid acid which are attributable to a charge deficiency in the silicate framework as in aluminosilicate zeolites. In the iron silicate of the invention, the iron serving as an active metal in the catalyst is present as highly dispersed isolated iron ions ($Fe^{3+}$). In selective reduction reactions in which ammonia or the like is used, the iron is inhibited from aggregating and the iron silicate shows high activity.

The β-type iron silicate constituting the nitrogen oxide removal catalyst of the invention is a crystalline silicate which has iron contained in the β-type framework structure. The $SiO_2/Al_2O_3$ molar ratio thereof is in the range of 20-70, preferably 20-60. When the $SiO_2/Al_2O_3$ molar ratio thereof is less than 20, this iron silicate has an increased aluminum content. However, in the case where the amount of aluminum in the framework is too large, demetallization of the framework, such as dealumination and iron elimination, and metal aggregation are apt to proceed considerably upon a hydrothermal treatment, making it difficult for the iron silicate to sufficiently hold isolated $Fe^{3+}$, which contributes to activity. It is hence preferred that the $SiO_2/Al_2O_3$ molar ratio should be 20 or more. In the case where the $SiO_2/Al_2O_3$ molar ratio exceeds 70, the results are too small an amount of aluminum within the framework and a reduced solid-acid amount, making it impossible to obtain sufficient catalytic activity. It is especially preferred that the $SiO_2/Al_2O_3$ molar ratio should be 60 or less, more preferably 50 or less.

When the $SiO_2/Fe_2O_3$ molar ratio thereof is less than 50, this iron silicate has an increased iron content. However, in the case where the amount of iron in the framework is too large, demetallization of the framework, such as dealumination and iron elimination, and metal aggregation are apt to proceed considerably upon a hydrothermal treatment, making it difficult for the iron silicate to sufficiently hold isolated $Fe^{3+}$, which contributes to activity. It is hence preferred that the $SiO_2/Fe_2O_3$ molar ratio should be 50 or more. In the case where the $SiO_2/Fe_2O_3$ molar ratio thereof exceeds 200, the absolute amount of iron ions in this iron silicate is too small to obtain sufficient catalytic activity. The $SiO_2/Fe_2O_3$ molar ratio is 50-200, preferably in the range of 100-200.

Incidentally, in the β-type iron silicate constituting the nitrogen oxide removal catalyst of the invention, the iron which contributes most to the reduction of nitrogen oxides has not been aggregated to form $Fe_2O_3$ but is present in the state of having been dispersed as isolated iron ions ($Fe^{3+}$) in the silicate framework which will be described later. The term "$SiO_2/Fe_2O_3$ molar ratio" used for defining the composition of the β-type iron silicate of the invention is an expression used for convenience in order to define the content of all iron including isolated iron ions.

The β-type iron silicate constituting the nitrogen oxide removal catalyst of the invention has a full width at half maximum (FWHM) of the X-ray crystal diffraction (302) plane of 0.30-0.40°. The full width at half maximum (FWHM) is an index to the state of the crystals, and indicates the regularity of the crystals and the degree of distortion of the lattice. The larger the value thereof, the lower the crystallinity of the crystals and the more the lattice is distorted. Such an iron silicate is thought to show enhanced interaction between the silica framework and the iron and aluminum and to have improved catalytic activity after a hydrothermal treatment.

Incidentally, an examination by X-ray crystal diffractometry is made on the β-type iron silicate which has undergone a heat treatment for removing the SDA.

On the other hand, in the case where the full width at half maximum (FWHM) thereof is exceedingly large, it is thought that disintegration of the zeolite structure itself has proceeded excessively, resulting in considerably reduced catalytic activity. Consequently, in the case where the β-type iron silicate has a full width at half maximum (FWHM) less than 0.30°, this iron silicate has a small distortion and insufficient interaction between the silica framework and the iron and aluminum and, hence, comes to have reduced catalytic activity through a hydrothermal treatment. In the case where the full width at half maximum exceeds 0.40°, disintegration of the zeolite structure itself has proceeded considerably excessively, resulting in reduced catalytic activity.

It is preferred that the β-type iron silicate constituting the nitrogen oxide removal catalyst of the invention should have an average crystal grain diameter in the range of 0.2-2.0 μm. The reasons for this are as follows. In the case where the average crystal grain diameter thereof is less than 0.2 μm, this iron silicate has low hydrothermal durability and cannot retain the catalytic activity. In the case where the average crystal grain diameter thereof exceeds 2.0 μm, this iron silicate is reduced in handleability required for coating, molding, etc. The average crystal grain diameter thereof is more preferably 0.2-1.0 μm.

The nitrogen oxide removal catalyst of the invention has excellent hydrothermal durability. Specifically, after having undergone a hydrothermal endurance treatment conducted at 700° C. for 20 hours in an atmosphere containing 10% by volume water vapor at a gas flow rate/zeolite volume ratio of 100 per minute, the catalyst has an $NO_X$ reduction percentage of 45-60% at a reaction temperature of 200° C.; the $NO_X$ reduction percentage is an index to low-temperature activity and hydrothermal durability, which are considered to be important for nitrogen oxide removal catalysts.

Consequently, the nitrogen oxide removal catalyst of the invention can be used for stably treating $NO_X$ over a long period. The higher the $NO_X$ reduction percentage after the hydrothermal endurance treatment, the more the catalyst is preferred. However, the $NO_X$ reduction percentage thereof is about 60% at the most.

Hitherto, nitrogen oxide removal catalysts have generally been evaluated in terms of the performance of the catalysts which have undergone a hydrothermal endurance treatment. However, there is no hydrothermal endurance treatment which has been especially standardized. Those conditions of a hydrothermal endurance test shown above are within the range of conditions generally employed as conditions of hydrothermal endurance treatments of nitrogen oxide removal catalysts, and are not special conditions.

Thermal damage not only to β-type zeolites but also to other zeolites becomes more serious exponentially as the temperature rises above 600° C. Consequently, a 20-hour hydrothermal endurance treatment at 700° C. corresponds to a treatment at 650° C. conducted for 100-200 hours or more or to a treatment at 800° C. conducted for several hours.

The nitrogen oxide removal catalyst of the invention can be used after having been mixed with a binder, such as silica, alumina, a clay mineral, etc., and molded. Examples of the clay mineral for use in the molding include kaolin, attapulgite, montmorillonite, bentonite, allophane, and sepiolite.

The nitrogen oxide removal catalyst of the invention has high performance when used as a catalyst for discharge gas removal.

In the nitrogen oxide removal catalyst of the invention, the interaction between the silica framework and that part of the iron and aluminum which is contained in the framework is enhanced by a heat treatment. The catalyst is thereby made to exhibit, after a hydrothermal treatment, the high ability to decompose $NO_X$ especially at low temperatures. By bringing a discharge gas which contains nitrogen oxides into contact with the catalyst, the discharge gas can be removed to a high degree.

Examples of the nitrogen oxides that can be removed according to the invention include nitrogen monoxide, nitrogen dioxide, dinitrogen trioxide, dinitrogen tetroxide, dinitrogen monoxide, and mixtures of these. Preferred are nitrogen monoxide, nitrogen dioxide, and dinitrogen monoxide. There is no particular limitation on the nitrogen oxide concentration of the discharge gas that can be treated by the invention.

The discharge gas may contain components other than nitrogen oxides. For example, the discharge gas may contain hydrocarbons, carbon monoxide, carbon dioxide, hydrogen, nitrogen, oxygen, sulfur oxides, and water. Specifically, by the method of the invention, nitrogen oxides can be removed from various discharge gases emitted from diesel-powered motor vehicles, gasoline-powered motor vehicles, boilers, gas turbines, etc.

The nitrogen oxide removal catalyst of the invention is effective in removing nitrogen oxides when used as an SCR catalyst for removing nitrogen oxides especially in the presence of a reducing agent.

As the reducing agent, use can be made of the hydrocarbons, carbon monoxide, hydrogen, and the like which are contained in the discharge gas. According to need, a suitable reducing agent may be added to the discharge gas and caused to coexist therein. The reducing agent to be added to the discharge gas is not particularly limited, and examples thereof include ammonia, urea, organic amines, hydrocarbons, alcohols, ketones, carbon monoxide, and hydrogen. In particular, from the standpoint of further heightening the efficiency of nitrogen oxide removal, it is especially preferred to use ammonia, urea, or an organic amine. With the aid of these reducing agents, the nitrogen oxides are converted to nitrogen, which is harmless, and the discharge gas can be thus treated.

Methods for adding those reducing agents are not particularly limited. Use can be made, for example, of a method in which a reducing ingredient in a gaseous state is directly added, a method in which a reducing ingredient in a liquid state, e.g., an aqueous solution, is sprayed and vaporized, or a method in which a reducing ingredient in such a liquid state is sprayed and pyrolyzed. The amount of those reducing agents to be added can be set at will so that the nitrogen oxides can be sufficiently removed.

The method of the invention for removing a nitrogen oxide using the nitrogen oxide removal catalyst is not particularly limited so long as the nitrogen oxide removal catalyst of the invention is used. For example, an SCR catalyst including the nitrogen oxide removal catalyst of the invention is brought into contact with a discharge gas at a space velocity of preferably 500-500,000 $hr^{-1}$, more preferably 2,000-300,000 $hr^{-1}$, on a volume basis.

Next, a process for producing the nitrogen oxide removal catalyst of the invention is explained.

The nitrogen oxide removal catalyst of the invention can be produced by synthesizing a crystallization product from a liquid reaction mixture which contains silica, aluminum, iron, and an organic structure-directing agent (SDA) and calcining the crystallization product at 700-850° C. in an atmosphere having a water vapor concentration of 5% by volume or higher less to remove the organic structure-directing agent.

The nitrogen oxide removal catalyst of the invention can be produced through crystallization from a feed-material composition which is to give a β-type iron silicate having a composition in which the $SiO_2/Al_2O_3$ molar ratio is 20-70 and the $SiO_2/Fe_2O_3$ molar ratio is 50-200. Through crystallization conducted under such conditions, isolated iron ions which are in a highly dispersed state and which have a highly symmetrical tetrahedral structure can be introduced into the framework structure of a β-type iron silicate. In the case where the amount of iron is too large, aggregation is apt to proceed upon fresh calcination or an endurance treatment, resulting in insufficient introduction of isolated iron ions of a symmetrical tetrahedral structure. In addition, the resultant β-type iron silicate is apt to have reduced crystallinity.

The starting materials for synthesis may be constituted of a silicon source, an iron source, an aluminum source, an SDA, an alkali, and water, and a fluorine source is added thereto according to need. As the silicon source, use can be made of colloidal silica, amorphous silica, sodium silicate, tetraethyl orthosilicate, aluminosilicate gel, or the like. As the iron source, use can be made of iron nitrate, iron chloride, iron sulfate, metallic iron, or the like. These starting materials preferably are materials which can be sufficiently evenly mixed with other ingredients.

As the SDA, use can be made of one or more compounds selected from the group consisting of compounds having a tetraethylammonium cation, such as tetraethylammonium hydroxide, tetraethylammonium bromide, and tetraethylammonium fluoride, and compounds having an octamethylenebisquinuclidine, α,α'-diquinuclidinyl-p-xylene, α,α'-diquinuclidinyl-m-xylene, α,α'-diquinuclidinyl-o-xylene, 1,4-diazabicyclo[2,2,2]octane, 1,3,3,N,N-pentamethyl-6-azonium bicyclo[3,2,1]octane, or N,N-diethyl-1,3,3-trimethyl-6-azonium bicyclo[3,2,1]octane cation.

As the alkali source, use can be made of sodium hydroxide, sodium sulfate, sodium chloride, sodium acetate, potassium hydroxide, potassium sulfate, potassium chloride, potassium acetate, rubidium hydroxide, rubidium sulfate, rubidium chloride, rubidium acetate, cesium hydroxide, cesium sulfate, cesium chloride, cesium acetate, or the like.

As the aluminum source, use can be made of aluminum sulfate, sodium aluminate, aluminum hydroxide, aluminum nitrate, aluminosilicate gel, metallic aluminum, or the like.

As the fluorine source, use can be made of hydrofluoric acid, sodium fluoride, potassium fluoride, ammonium fluoride, tetraethylammonium fluoride, or the like.

It is desirable that these starting materials should be materials which can be easily mixed evenly with other ingredients.

Examples of the composition of a mixture of starting materials include the following content ranges. However, the following content ranges are not restrictive, and the contents of the ingredients can be set at will so that the product to be finally yielded has a composition within the composition range for the β-type iron silicate constituting the nitrogen oxide removal catalyst of the invention. An ingredient which has the function of accelerating crystallization, such as, for example, seed crystals, may be added, and it is preferred to employ conditions under which a large crystal grain diameter is obtained.

$SiO_2/Al_2O_3$ molar ratio: 20-70, preferably 30-60, more preferably 30-50

$SiO_2/Fe_2O_3$ molar ratio: 50-200, preferably 100-200

$H_2O/SiO_2$ molar ratio: 5-50, preferably 5-10

$SDA/SiO_2$ molar ratio: 0.1-5, preferably 0.1-1

$Alkali/SiO_2$ molar ratio: 0-0.1

$F/SiO_2$ molar ratio: 0-5, preferably 0-1

A starting material mixture of water, a silicon source, an iron source, an aluminum source, an SDA, an alkali source, and optionally a fluorine source is crystallized at a temperature of 100-180° C. in a closed-type pressure vessel. During the crystallization, the starting-material mixture may be kept being mixed and stirred or may be kept standing still. After completion of the crystallization, the mixture is allowed to cool sufficiently and subjected to solid-liquid separation, and the solid matter is washed with a sufficient amount of pure water and dried at a temperature of 110-150° C. Thereafter, the SDA remaining in the pores is removed by calcination. Thus, a β-type iron silicate of the invention can be obtained.

It is thought that from the standpoint of inhibiting the silicate crystals from deteriorating thermally, it is usually desirable that the heat treatment for removing the SDA remaining in the pores of a β-type iron silicate should be conducted at a temperature which is as low as possible. For SDA removal, the following treatments have been performed: a calcination treatment in the air atmosphere at 550-650° C.; a liquid-phase treatment with an acidic solution or with a liquid chemical containing an ingredient which decomposes the SDA; and an exchange treatment with a resin or the like.

In the case of the nitrogen oxide removal catalyst of the invention, a heat treatment for SDA removal is conducted in the high temperature range of 700-850° C., which has not been employed so far. As a result, the interaction between the silica framework and that part of the iron and aluminum which is contained in the framework is enhanced, and the catalyst is made to exhibit improved low-temperature catalytic activity after a hydrothermal endurance treatment.

It is essential that the heat treatment for SDA removal in the production of the nitrogen oxide removal catalyst of the invention should be conducted at a water vapor concentration of 5% by volume or less. It is especially preferred to conduct the treatment at a water vapor concentration of 1% by volume or less from the standpoint of inhibiting the elimination of aluminum and iron from the framework and the aggregation and deactivation of the iron which are caused by water vapor. In the case where the treatment is conducted at a water vapor concentration exceeding 5% by volume, no improvement in performance due to interaction between the framework silica and that part of the iron and aluminum which is contained in the framework is brought about and iron aggregation is accelerated, resulting in reduced endurance activity after a hydrothermal treatment.

It is essential that the heat treatment in the production of the nitrogen oxide removal catalyst of the invention should be conducted at a temperature of 700-850° C. It is especially preferred to conduct the treatment at 800-850° C. In the case where the temperature is below 700° C., the interaction between the framework silica and that part of the iron and aluminum which is present in the framework is not sufficiently enhanced, making it impossible to obtain the catalytic activity according to the invention. On the other hand, in the case where the temperature exceeds 850° C., disintegration of the β-type iron silicate crystals proceeds considerably, resulting in a decrease in catalytic activity.

The period of the heat treatment is not particularly limited. However, in the case where the heat treatment period is too short, the interaction between the iron and the silica framework is not sufficiently enhanced. It is therefore preferred to hold the iron silicate for 1 hour or more.

It is preferred that the β-type iron silicate constituting the nitrogen oxide removal catalyst of the invention should have a crystal grain diameter (average crystal grain diameter), as determined through an examination with an electron microscope (SEM), of 0.2-2.0 μm, in particular, 0.2-1.0 μm, from the standpoints of hydrothermal resistance and ease of handling during coating, molding, etc.

Since active isolated iron ions are contained in the β-type iron silicate constituting the nitrogen oxide removal catalyst of the invention, this β-type iron silicate as such can be used as a catalyst for removing nitrogen oxides. However, a catalytically active metal species may be further loaded into the β-type iron silicate before the iron silicate is used.

The metal species to be loaded is not particularly limited. For example, one or more elements selected from elements belonging to Groups 8, 9, 10, and 11, in particular, selected from the group consisting of iron, cobalt, palladium, iridium, platinum, copper, silver, and gold, may be loaded. It is especially preferred that the metal species should be one or more of iron, palladium, platinum, copper, and silver. It is also possible to supplementally add a promoter ingredient such as a rare-earth metal, titanium, zirconia, or the like.

Methods for loading which can be used when a catalytically active metal species is to be loaded are not particularly limited. For the loading, use can be made of methods such as an ion-exchange method, impregnation loading method, evaporation-to-dryness method, precipitation loading method, and physical mixing method. Each of starting materials such as, for example, nitrates, sulfates, acetates, chlorides, complex salts, oxides, and composite oxides can be used in the metal loading. The amount of a metal to be loaded is not limited. However, the amount thereof is especially preferably in the range of 0.1-10% by weight.

The β-type iron silicate constituting the nitrogen oxide removal catalyst of the invention can be used after having been mixed with a binder, such as silica, alumina, a clay mineral, etc., and molded. Examples of the clay mineral for use in the molding include kaolin, attapulgite, montmorillonite, bentonite, allophane, and sepiolite. It is also possible to use the β-type iron silicate after having been applied as a wash coat to a honeycomb base made of either cordierite or a metal.

EXAMPLES

The invention will be explained below by reference to Examples. However, the invention should not be construed as being limited to the following Examples.

The following Examples 1 to 9 and Comparative Examples 1 to 3 relate to the β-type iron silicate of the invention described under (1) and (2) above and to the process for β-type iron silicate production described under (3) and (4) above.

Example 1

Sodium silicate No. 3 ($SiO_2$, 30%; $Na_2O$, 9.1%; $Al_2O_3$, 0.01%), 98% sulfuric acid, water, and iron nitrate nonahydrate were mixed together in given amounts.

The resultant gel was taken out by solid-liquid separation and washed with pure water.

To the washed gel were added given amounts of water, 35% TEAOH, and 48% NaOH.

The ingredients were sufficiently stirred and mixed. The composition of this reaction mixture was $SiO_2$:$0.015Fe_2O_3$:$0.00046Al_2O_3$:$0.20Na_2O$:$0.15TEAOH$:$10H_2O$. This reaction mixture was placed in an autoclave made of stainless steel, and the autoclave was closed. The contents were heated at 150° C. for 90 hours under rotating condition to crystallize a β-type iron silicate. The slurry mixture which had undergone the crystallization was white, and the crystals had a fluorine content below 100 ppm, which was a limit of determination by the analysis. Namely, the fluorine content was below the detection limit.

Figure 3:
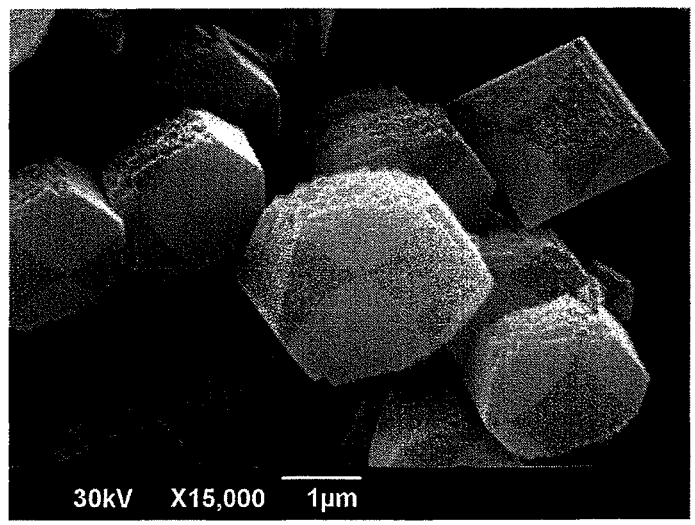
FIG. 3 is a presentation which shows the results of an examination with a scanning electron microscope of the β-type iron silicate obtained in Example 1.

The results of an examination with a scanning electron microscope of the crystal grains obtained are shown in FIG. 3.

Example 2

A reaction mixture was prepared in the same manner as in Example 1. The composition of the reaction mixture was $SiO_2$:$0.010Fe_2O_3$:$0.00040Al_2O_3$: $0.19Na_2O$:$0.15TEAOH$:$10H_2O$. This reaction mixture was placed in an autoclave made of stainless steel, and the autoclave was closed. The contents were heated at 150° C. for 90 hours with stirring to crystallize a β-type iron silicate. The slurry mixture which had undergone the crystallization was white, and the crystals had a fluorine content below the detection limit.

Example 3

A reaction mixture was prepared in the same manner as in Example 1. The composition of the reaction mixture was $SiO_2$:$0.020Fe_2O_3$:$0.00041Al_2O_3$: $0.197Na_2O$:$0.15TEAOH$:$10H_2O$. This reaction mixture was placed in an autoclave made of stainless steel, and the autoclave was closed.

The contents were heated at 170° C. for 90 hours with stirring to crystallize a β-type iron silicate. The slurry mixture which had undergone the crystallization was white, and the crystals had a fluorine content below the detection limit.

Example 4

A reaction mixture was prepared in the same manner as in Example 1. The composition of the reaction mixture was $SiO_2$:$0.034Fe_2O_3$:$0.00069Al_2O_3$:$0.20Na_2O$:$0.15TEAOH$:$9.9H_2O$. This reaction mixture was placed in an autoclave made of stainless steel, and the autoclave was closed.

The contents were heated at 150° C. for 90 hours with stirring to crystallize a β-type iron silicate. The slurry mixture which had undergone the crystallization was white, and the crystals had a fluorine content below the detection limit.

Example 5

A reaction mixture was prepared in the same manner as in Example 1. The composition of the reaction mixture was $SiO_2:0.015Fe_2O_3:0.00046Al_2O_3:0.18Na_2O:0.15TEAOH:8.9H_2O$. This reaction mixture was placed in an autoclave made of stainless steel, and the autoclave was closed.

The contents were heated at 150° C. for 90 hours with stirring to crystallize a β-type iron silicate. The slurry mixture which had undergone the crystallization was white, and the crystals had a fluorine content below the detection limit.

Comparative Example 1

Sodium silicate No. 3 ($SiO_2$, 30%; $Na_2O$, 9.1%; $Al_2O_3$, 0.01%), 98% sulfuric acid, water, and iron nitrate nonahydrate were mixed together in given amounts.

The resultant gel was taken out by solid-liquid separation and washed with pure water.

To the washed gel were added given amounts of water, TEAOH, and 48% NaOH. The ingredients were sufficiently stirred and mixed. The composition of this reaction mixture was $SiO_2:0.015Fe_2O_3:0.00046Al_2O_3:0.075Na_2O:0.40TEAOH:10H_2O$. This reaction mixture was placed in an autoclave made of stainless steel, and the autoclave was closed. The contents were heated at 150° C. for 90 hours with stirring to crystallize a β-type iron silicate. The slurry mixture which had undergone the crystallization was white, and the crystals had a fluorine content below the detection limit.

Figure 4:
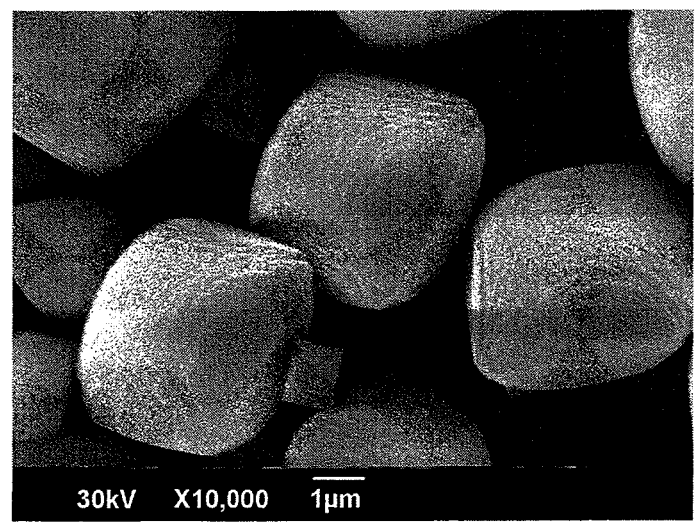
FIG. 4 is a presentation which shows the results of an examination with a scanning electron microscope of the β-type iron silicate obtained in Comparative Example 1.

The results of an examination with a scanning electron microscope of the crystal grains obtained are shown in FIG. 4. The crystal grains obtained had a hill-shaped crystalline form having insufficiently formed ridge lines.

Comparative Example 2

In 264 g of TEAOH was dissolved 9.43 g of iron nitrate nonahydrate. Thereto was added 214 g of tetraethyl orthosilicate. The ingredients were sufficiently stirred and mixed together, and the resultant mixture was hydrolyzed at room temperature. The ethanol yielded was vaporized. Subsequently, a given amount of the water was vaporized. To the residue was added 21.45 g of 48% hydrofluoric acid.

The ingredients were mixed together by means of a mortar. The resultant reaction mixture was filled into an autoclave made of stainless steel, and heated at 150° C. for 240 hours to conduct crystallization. The composition of the reaction mixture was $SiO_2:0.016Fe_2O_3:0.50HF:0.61TEAOH:7.5H_2O$. The slurry mixture which had undergone the crystallization was white, and the crystals had a fluorine content of 14,000 ppm. These crystals were calcined at 600° C. for 2 hours in an air stream to remove the SDA. The crystals thus treated had a fluorine content of 430 ppm.

Comparative Example 3

A reaction mixture was prepared in the same manner as in Comparative Example 1, except that tetraethylammonium fluoride (TEAF) was used as a starting material. The composition of the reaction mixture was $SiO_2:0.038Fe_2O_3:0.0012Al_2O_3:0.024Na_2O:0.11TEAOH:0.50TEAF:7.6H_2O$. This reaction mixture was placed in an autoclave made of stainless steel, and the autoclave was closed. The contents were heated and reacted at 150° C. for 240 hours. The reaction product was analyzed by X-ray diffractometry. As a result, no diffraction pattern characteristic of the β-type was observed, and the reaction product was found to be amorphous.

Example 6

The β-type iron silicates synthesized in Examples 1 to 5 and Comparative Example 1 were analyzed for crystal composition by inductively coupled plasma emission spectrometry. The results thereof are shown in the following Table 2. Each β-type iron silicate contained iron in an amount of 5.5% or more.

TABLE 2

| Sample | Fe content (wt %) | $SiO_2/Al_2O_3$ |
| --- | --- | --- |
| Example 1 | 6.7 | 860 |
| Example 2 | 6.7 | 760 |
| Example 3 | 7.7 | 1050 |
| Example 4 | 11.3 | 630 |
| Example 5 | 6.7 | 1040 |
| Comparative Example 1 | 6.6 | 820 |

Example 7

The β-type iron silicates synthesized in Example 1 and Comparative Example 1 were examined for form with a scanning electron microscope. The results for Example 1 are shown in FIG. 3, and the results for Comparative Example 1 are shown in FIG. 4. The β-type iron silicate of Example 1 had the shape of a truncated square bipyramid having clear ridge lines, while the β-type iron silicate of Comparative Example 1, which had been synthesized using an SDA in a large amount exceeding 0.35 in terms of molar ratio to the $SiO_2$, showed a hill-shaped crystalline form having insufficiently formed ridge lines.

Example 8

The β-type iron silicates synthesized in Example 1 and Comparative Example 1 were evaluated for hydrothermal resistance. Samples (fresh samples) from which the SDA had been removed by calcination were molded into pellets and then crushed before being subjected to the evaluation. Each sample was filled into a fixed-bed flow-through type reaction tube and subjected to a 5-hour endurance treatment at a given temperature while passing 10 vol % $H_2O$ therethrough. The fresh samples and the samples which had undergone the endurance treatment were analyzed by X-ray powder crystal diffractometry using an ordinary Cu—Kα line source, and the degree of crystallinity of each sample was determined from the height of the diffraction peak appearing at $2θ=22.3°$.

The results thereof are shown in the following Table 3.

TABLE 3

| Treatment conditions | X-ray diffraction intensity (relative value) | |
| --- | --- | --- |
| | Example 1 | Comparative Example 1 |
| Fresh | 100 | 92 |
| 850° C. | 108 | 83 |
| 900° C. | 103 | 62 |
| 1000° C. | 73 | 28 |

As apparent from the results, the β-type iron silicate of the invention showed no decrease in crystallinity at all even upon the 900° C. endurance treatment and still retained a high degree of crystallinity even after the 1,000° C. endurance treatment. The difference between the fresh sample of the β-type iron silicate of the Comparative Example and that of the β-type iron silicate of the invention was not large. However, the β-type iron silicate of the Comparative Example decreased considerably in the degree of crystallinity as the endurance treatment temperature rose.

Example 9

The β-type iron silicate synthesized in Example 1 was subjected to electron spin resonance spectroscopy to ascertain the presence of iron in the framework.

Conditions for the electron spin resonance spectroscopy are shown below.

Figure 5:
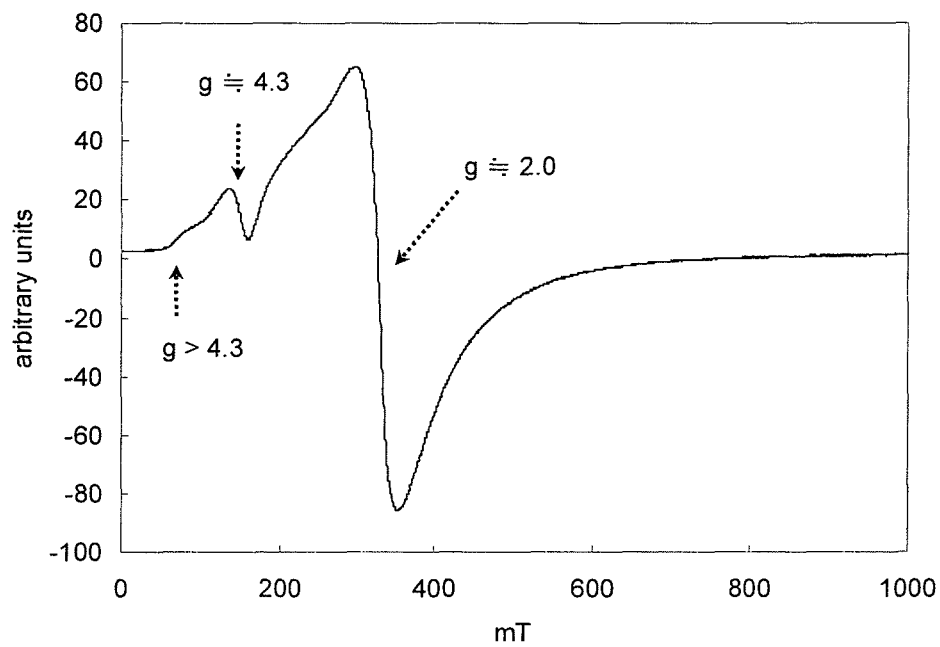
FIG. 5 is a presentation which shows an electron spin resonance spectrum of the β-type iron silicate obtained in Example 1.

Measurement temperature: 77 K
Microwave output: 1.0 mW
Observation range: 0-1,000 mT
Modulation width: 0.32 mT
Time constant: 0.3 sec
Sample amount: about 10 mg The spectrum obtained by the measurement is shown in FIG. 5. A large resonance absorption peak was observed at g≈2.0, and it was thus ascertained that iron having a highly symmetrical tetrahedral structure was present in the silicate framework.

The following Examples 10 to 20 and Comparative Examples 4 to 6 relate to the β-type iron silicate of the invention described under (5) to (8) above and to the process described under (9) above which is for producing the β-type iron silicate of the invention.

Example 10

Sodium silicate No. 3 ($SiO_2$, 30%; $Na_2O$, 9.1%; $Al_2O_3$, 0.01%), 98% sulfuric acid, water, an aqueous aluminum sulfate solution, and iron nitrate nonahydrate were mixed together in given amounts. The resultant gel was taken out by solid-liquid separation and washed with pure water. To the washed gel were added given amounts of water, 35% TEAOH, cesium hydroxide monohydrate, and seed crystals. The ingredients were sufficiently stirred and mixed. The composition of this reaction mixture was $SiO_2$:0.015$Fe_2O_3$: 0.026$Al_2O_3$:0.049$Cs_2O$:0.15TEAOH:10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below 100 ppm, which was a limit of determination by the analysis. Namely, the fluorine content was below the detection limit.

Example 11

A reaction mixture was prepared in the same manner as in Example 10. The composition of the reaction mixture was $SiO_2$:0.012$Fe_2O_3$:0.025$Al_2O_3$:0.015$Cs_2O$:0.15TEAOH: 10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below the detection limit.

Example 12

A reaction mixture was prepared in the same manner as in Example 10, except that 48% aqueous potassium hydroxide solution was used in place of the cesium hydroxide monohydrate. The composition of the reaction mixture was $SiO_2$: 0.010$Fe_2O_3$:0.012$Al_2O_3$:0.030$K_2O$: 0.14TEAOH:10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below the detection limit.

Example 13

A reaction mixture was prepared in the same manner as in Example 12. The composition of the reaction mixture was $SiO_2$:0.0062$Fe_2O_3$:0.019$Al_2O_3$:0.021$K_2O$:0.15TEAOH: 10$H_2O$. This reaction mixture was placed in an autoclave made of stainless steel, and the autoclave was closed. The contents were heated at 150° C. for 90 hours with stirring to crystallize a β-type iron silicate. The slurry mixture which had undergone the crystallization was white, and the crystals had a fluorine content below the detection limit.

Example 14

A reaction mixture was prepared in the same manner as in Example 12. The composition of the reaction mixture was $SiO_2$:0.0067$Fe_2O_3$:0.028$Al_2O_3$:0.031$K_2O$:0.15TEAOH: 10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below the detection limit.

Example 15

A reaction mixture was prepared in the same manner as in Example 10, except that rubidium hydroxide n-hydrate was used in place of the cesium hydroxide monohydrate. The composition of the reaction mixture was $SiO_2$:0.0069$Fe_2O_3$: 0.034$Al_2O_3$:0.030$Rb_2O$:0.15TEAOH:10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below the detection limit.

Comparative Example 4

A reaction mixture was prepared in the same manner as in Example 10, except that 48% aqueous sodium hydroxide solution was used in place of the cesium hydroxide monohydrate. The composition of the reaction mixture was $SiO_2$: 0.015$Fe_2O_3$:0.026$Al_2O_3$:0.049$Na_2O$:0.15TEAOH:10$H_2O$. This reaction mixture was placed in an autoclave made of stainless steel, and the autoclave was closed. The contents were heated at 150° C. for 48 hours with stirring to crystallize a β-type iron silicate. The slurry mixture which had undergone the crystallization was white, and the crystals had a fluorine content below the detection limit.

Comparative Example 5

Iron nitrate nonahydrate was dissolved in TEAOH. Thereafter, sodium aluminate and pure water were added to the solution, and a silica sol ($SiO_2$, 40%; $Na_2O$, 0.5%; $Al_2O_3$, 0.00%) and seed crystals were added thereto with vigorous agitation. The composition of the reaction mixture was $SiO_2:0.0058Fe_2O_3:0.038Al_2O_3:0.077Na_2O:0.12TEAOH:7.7H_2O$. The resultant gel was continuously stirred for 30 minutes. Thereafter, this reaction mixture was placed in an autoclave made of stainless steel, and the autoclave was closed. The contents were heated at 160° C. for 48 hours with stirring to crystallize a β-type iron silicate. The slurry mixture which had undergone the crystallization was white, and the crystals had a fluorine content below the detection limit.

Comparative Example 6

Iron nitrate nonahydrate was dissolved in TEAOH, and tetraethyl orthosilicate was added thereto. The ingredients were sufficiently stirred and mixed together, and the resultant mixture was hydrolyzed at room temperature. The ethanol yielded was vaporized. Subsequently, a given amount of the water was vaporized. To the residue was added 48% hydrofluoric acid. The ingredients were mixed together by means of a mortar. The resultant reaction mixture was filled into an autoclave made of stainless steel, and heated at 150° C. for 240 hours to conduct crystallization. The composition of the reaction mixture was $SiO_2:0.016Fe_2O_3:0.50HF:0.61TEAOH:7.5H_2O$. The slurry mixture which had undergone the crystallization was white, and the crystals had a fluorine content of 14,000 ppm. These crystals were calcined at 600° C. for 2 hours in an air stream to remove the SDA. The crystals thus treated had a fluorine content of 430 ppm.

Example 16

The β-type iron silicates synthesized in Examples 10 to 15 and Comparative Examples 4 and 5 were analyzed for crystal composition by inductively coupled plasma emission spectrometry. The results thereof are shown in the following Table 4.

TABLE 4

| Sample | $SiO_2/Al_2O_3$ | $SiO_2/Fe_2O_3$ |
|---|---|---|
| Example 10 | 34 | 56 |
| Example 11 | 39 | 80 |
| Example 12 | 69 | 93 |
| Example 13 | 49 | 143 |
| Example 14 | 35 | 144 |
| Example 15 | 26 | 138 |
| Comparative Example 4 | 34 | 56 |
| Comparative Example 5 | 22 | 154 |

Example 17

The β-type iron silicates synthesized in Examples 10 to 15 and Comparative Examples 4 and 5 were analyzed by X-ray diffractometry.
Conditions for the X-ray diffractometry are shown below.
Target: Cu
Accelerating voltage: 40 kV
Current: 30 mA
Step interval: 0.02°
Sampling time: 1 sec
Divergence slit: 1°
Anti-scattering slit: 1°
Receiving slit: 0.3 mm The results thereof are shown in Table 5. The full widths at half maximum for the Examples were in the range of 0.16-0.24°.

TABLE 5

| Sample | Full width at half maximum for (302) plane |
|---|---|
| Example 10 | 0.24 |
| Example 11 | 0.22 |
| Example 12 | 0.18 |
| Example 13 | 0.18 |
| Example 14 | 0.18 |
| Example 15 | 0.22 |
| Comparative Example 4 | 0.34 |
| Comparative Example 5 | 0.38 |

Example 18

The β-type iron silicates synthesized in Example 10 and Comparative Example 4 were evaluated for hydrothermal resistance. Samples (fresh samples) from which the SDA had been removed by calcination were molded into pellets and then crushed before being subjected to the evaluation. Each sample was filled into a fixed-bed flow-through type reaction tube and subjected to a 5-hour endurance treatment at a given temperature while passing 10 vol % $H_2O$ therethrough. The fresh samples and the samples which had undergone the endurance treatment were analyzed by X-ray powder crystal diffractometry using an ordinary Cu—Kα line source, and the degree of crystallinity of each sample was determined from the height of the diffraction peak appearing at 2θ=22.3°.

The results thereof are shown in the following Table 6.

TABLE 6

| Treatment conditions | X-ray diffraction intensity (relative value) | |
|---|---|---|
| | Example 10 | Comparative Example 4 |
| Fresh | 100 | 86 |
| 850° C. | 73 | 60 |
| 900° C. | 52 | 42 |
| 1000° C. | 14 | 9 |

As apparent from the results, the β-type iron silicate of the invention showed higher hydrothermal resistance than the Comparative Example even after any treatment.

Example 19

The β-type iron silicates synthesized in Examples 10 to 15 and Comparative Examples 4 to 6 were examined with an SEM at a magnification of 15,000 diameters. The average crystal grain diameters of the β-type iron silicates thus obtained are shown in the following Table 7.

TABLE 7

| Sample | Average crystal grain diameter (μm) |
|---|---|
| Example 10 | 0.24 |
| Example 11 | 0.24 |
| Example 12 | 0.26 |
| Example 13 | 0.34 |
| Example 14 | 0.28 |
| Example 15 | 0.26 |
| Comparative Example 4 | 0.19 |
| Comparative Example 5 | 0.10 |
| Comparative Example 6 | 5.0 |

Example 20

The β-type iron silicate synthesized in Example 10 was subjected to electron spin resonance spectroscopy to ascertain the presence of iron in the framework.

Conditions for the electron spin resonance spectroscopy are shown below.

Figure 6:
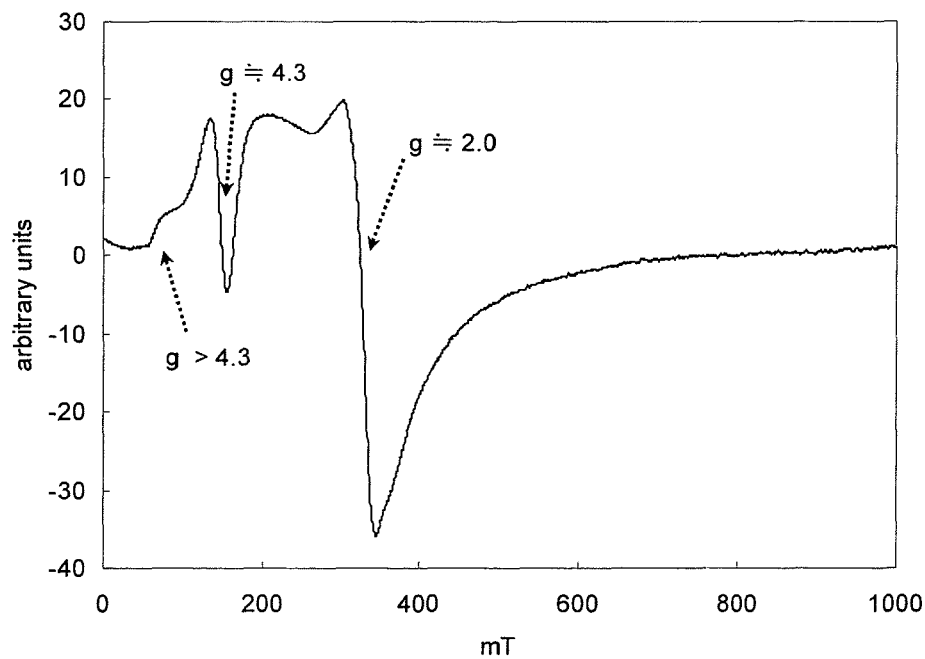
FIG. 6 is a presentation which shows an electron spin resonance spectrum of the β-type iron silicate obtained in Example 10.

Measurement temperature: 77 K
Microwave output: 1.0 mW
Observation range: 0-1,000 mT
Modulation width: 0.32 mT
Time constant: 0.3 sec
Sample amount: about 10 mg The spectrum obtained by the measurement is shown in FIG. 6.

A large resonance absorption peak was observed at g≈2.0, and it was thus ascertained that iron having a highly symmetrical tetrahedral structure was present in the silicate framework.

The following Examples 21 to 23 and Comparative Examples 7 to 9 relate to the nitrogen oxide removal catalyst constituted of another β-type iron silicate of the invention, the process for producing the catalyst, and the method for nitrogen oxide removal with the catalyst which were described under (10) to (17) above.

(Measurement of Full Width at Half Maximum (FWHM) Through X-Ray Diffractometry)

The main peak appearing at around 2θ=22.6° which was obtained by X-ray powder crystal diffractometry using an ordinary Cu—Kα line source was used to determine the full width at half maximum (FWHM). Conditions for the X-ray diffractometry were the same as those shown in Example 17.

(Hydrothermal Endurance Treatment Conditions)

A nitrogen oxide removal catalyst was treated under the following conditions.

Temperature: 700° C.
Period: 20 hours
Water concentration in gas: 10 vol %
Gas flow rate/zeolite volume ratio: 100 per minute (Determination of $NO_X$ Reduction Percentage)

For determining the percentage of $NO_X$ reduction, the gas satisfying the following conditions was brought into contact at a given temperature. The resultant degree of reduction of the nitrogen oxide was taken as that $NO_X$ reduction percentage. In a general method for evaluating nitrogen oxide removal catalysts, a gas which contains NO gas to be reductionally decomposed and ammonia as a reducing agent in a ratio of 1:1 is used for the evaluation. The $NO_X$ reduction conditions used in the invention are within the range of general conditions for evaluating the $NO_X$-reducing properties of ordinary nitrogen oxide removal catalysts, and are not special conditions.

Nitrogen Reduction Conditions Employed for the Evaluation in the Invention:

| Composition of raw gas to be treated | |
|---|---|
| NO | 200 ppm |
| $NH_3$ | 200 ppm |
| $O_2$ | 10 vol % |
| $H_2O$ | 3 vol % |
| Remainder | $N_2$ balance |
| Raw gas flow rate | 1.5 L/min |
| Raw gas/catalyst volume ratio | 1000/min |

Example 21

An aqueous sodium silicate solution, an aqueous aluminum sulfate solution, an aqueous ferric nitrate solution, and sulfuric acid were used and reacted with stirring so as to give a slurry product having the composition $SiO_2$:0.027$Al_2O_3$: 0.007$Fe_2O_3$. The resultant slurry product was dehydrated and then washed to obtain a particulate amorphous silicate.

Subsequently, ingredients were mixed together so as to result in a reaction mixture having the composition $SiO_2$: 0.027$Al_2O_3$:0.007$Fe_2O_3$:0.060KOH:0.15TEAOH:10$H_2O$. Furthermore, 1 part of seed crystals (HSZ940NHA, manufactured by Tosoh Corp.) were added to 100 parts of the composition. The resultant mixture was subjected to hydrothermal crystallization in an autoclave at 150° C. for 60 hours (TEAOH: 35% aqueous solution of tetraethylammonium hydroxide).

The slurry which had undergone the crystallization was subjected to solid-liquid separation, and the solid matter was washed with a sufficient amount of pure water and dried at 110° C. The resultant dry powder was calcined at 800° C. for 2 hours in a stream of dry air having a water vapor concentration of 0.05% by volume. Thus, catalyst 1 was obtained.

Catalyst 1 was analyzed for composition by ICP emission spectrometry and was found to have an $SiO_2/Al_2O_3$ molar ratio of 35 and an $SiO_2/Fe_2O_3$ molar ratio of 144. The catalyst had an average crystal grain diameter of 0.28 μm, and had a full width at half maximum (FWHM) of the X-ray crystal diffraction (302) plane of 0.36°. After a hydrothermal endurance treatment at 700° C. for 20 hours in a 10-vol % water vapor atmosphere, the catalyst showed an $NO_X$ reduction percentage of 50% at a reaction temperature of 200° C. The catalyst which had not undergone the endurance treatment showed an $NO_X$ reduction percentage of 50% at a reaction temperature of 200° C.

Figure 7:
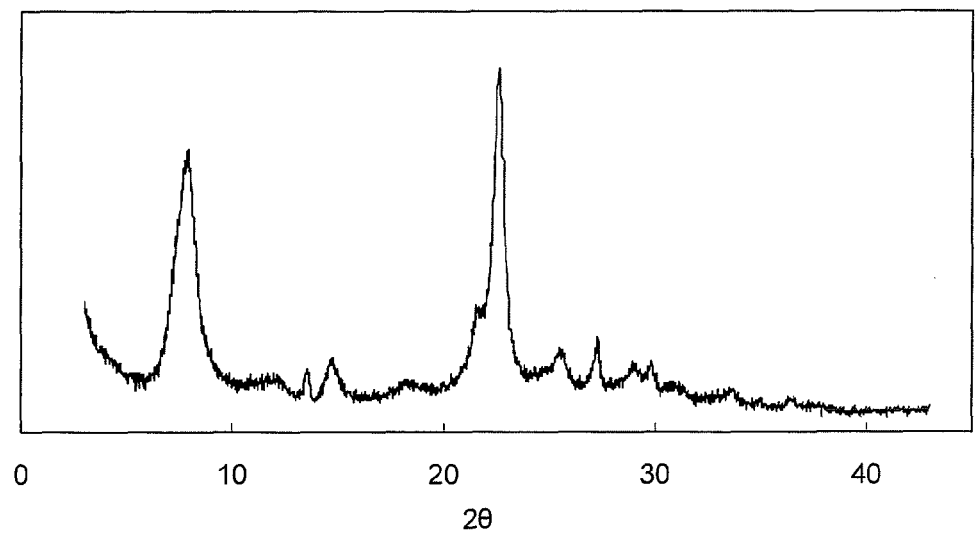
FIG. 7 is a presentation which shows an X-ray diffraction pattern of the nitrogen oxide removal catalyst obtained in Example 21.

The X-ray diffraction chart of catalyst 1 is shown in FIG. 7. The peak pattern agrees with the pattern for β-type zeolites. It is hence apparent that catalyst 1 has a β-type crystal structure.

Example 22

Catalyst 2 was obtained in the same manner as in Example 21, except that an aqueous sodium silicate solution, an aqueous aluminum sulfate solution, an aqueous ferric nitrate solution, and sulfuric acid were used so as to give a slurry product having the composition $SiO_2$:0.035$Al_2O_3$: 0.007$Fe_2O_3$, that ingredients were mixed together so as to result in a reaction mixture having the composition $SiO_2$: 0.035$Al_2O_3$:0.007$Fe_2O_3$:0.060KOH:0.15TEAOH:10$H_2O$, and that 0.5 parts of seed crystals (HSZ940NHA, manufactured by Tosoh Corp.) were added to 100 parts of the composition.

Catalyst 2 was analyzed for composition by ICP emission spectrometry and was found to have an $SiO_2/Al_2O_3$ molar ratio of 26 and an $SiO_2/Fe_2O_3$ molar ratio of 138. The catalyst had an average crystal grain diameter of 0.26 μm, and had a full width at half maximum (FWHM) of the X-ray crystal diffraction (302) plane of 0.34°. After a hydrothermal endurance treatment at 700° C. for 20 hours in a 10-vol % water vapor atmosphere, the catalyst showed an $NO_X$ reduction percentage of 47% at a reaction temperature of 200° C. The catalyst which had not undergone the endurance treatment showed an $NO_X$ reduction percentage of 47% at a reaction temperature of 200° C.

Example 23

Catalyst 3 was obtained in the same manner as in Example 21, except that an aqueous sodium silicate solution, an aqueous aluminum sulfate solution, an aqueous ferric nitrate solution, and sulfuric acid were used so as to give a slurry product having the composition $SiO_2$:0.026$Al_2O_3$: 0.015$Fe_2O_3$, that ingredients were mixed together so as to result in a reaction mixture having the composition $SiO_2$:0.026$Al_2O_3$:0.015$Fe_2O_3$:0.100KOH:0.15TEAOH:10$H_2O$, and that 0.5 parts of seed crystals (HSZ940NHA, manufactured by Tosoh Corp.) were added to 100 parts of the composition.

Catalyst 3 was analyzed for composition by ICP emission spectrometry and was found to have an $SiO_2/Al_2O_3$ molar ratio of 34 and an $SiO_2/Fe_2O_3$ molar ratio of 56.

The catalyst had an average crystal grain diameter of 0.24 μm, and had a full width at half maximum (FWHM) of the X-ray crystal diffraction (302) plane of 0.36°. After a hydrothermal endurance treatment at 700° C. for 20 hours in a 10-vol % water vapor atmosphere, the catalyst showed an $NO_X$ reduction percentage of 46% at a reaction temperature of 200° C. The catalyst which had not undergone the endurance treatment showed an $NO_X$ reduction percentage of 55% at a reaction temperature of 200° C.

Comparative Example 7

Comparative catalyst 1 was obtained in the same manner as in Example 21, except that an aqueous sodium silicate solution, an aqueous aluminum sulfate solution, an aqueous ferric nitrate solution, and sulfuric acid were used so as to give a slurry product having the composition $SiO_2$: 0.009$Al_2O_3$:0.017$Fe_2O_3$, and that ingredients were mixed together so as to result in a reaction mixture having the composition $SiO_2$:0.009$Al_2O_3$:0.017$Fe_2O_3$:0.050KOH: 0.15TEAOH:10$H_2O$.

Comparative catalyst 1 was analyzed for composition by ICP emission spectrometry and was found to have an $SiO_2/Al_2O_3$ molar ratio of 102 and an $SiO_2/Fe_2O_3$ molar ratio of 49. The catalyst had an average crystal grain diameter of 0.24 μm, and had a full width at half maximum (FWHM) of the X-ray crystal diffraction (302) plane of 0.34°. After a hydrothermal endurance treatment at 700° C. for 20 hours in a 10-vol % water vapor atmosphere, the catalyst showed an $NO_X$ reduction percentage of 36% at a reaction temperature of 200° C. The catalyst which had not undergone the endurance treatment showed an $NO_X$ reduction percentage of 54% at a reaction temperature of 200° C.

Comparative Example 8

Comparative catalyst 2 was obtained in the same manner as in Example 21, except that an aqueous sodium silicate solution, an aqueous aluminum sulfate solution, an aqueous ferric nitrate solution, and sulfuric acid were used so as to give a slurry product having the composition $SiO_2$: 0.009$Al_2O_3$:0.027$Fe_2O_3$, that ingredients were mixed together so as to result in a reaction mixture having the composition $SiO_2$:0.009$Al_2O_3$:0.027$Fe_2O_3$:0.140KOH: 0.15TEAOH:10$H_2O$, and that 0.5 parts of seed crystals (HSZ940NHA, manufactured by Tosoh Corp.) were added to 100 parts of the composition.

Comparative catalyst 2 was analyzed for composition by ICP emission spectrometry and was found to have an $SiO_2/Al_2O_3$ molar ratio of 88 and an $SiO_2/Fe_2O_3$ molar ratio of 30. The catalyst had an average crystal grain diameter of 0.19 μm, and had a full width at half maximum (FWHM) of the X-ray crystal diffraction (302) plane of 0.38°. After a hydrothermal endurance treatment at 700° C. for 20 hours in a 10-vol % water vapor atmosphere, the catalyst showed an $NO_X$ reduction percentage of 43% at a reaction temperature of 200° C. The catalyst which had not undergone the endurance treatment showed an $NO_X$ reduction percentage of 59% at a reaction temperature of 200° C.

Comparative Example 9

Comparative catalyst 3 was obtained in the same manner as in Example 21, except that the dry powder was calcined at 600° C. for 2 hours in a stream of dry air having a water vapor concentration of 0.05% by volume.

Comparative catalyst 3 was analyzed for composition by ICP emission spectrometry and was found to have an $SiO_2/Al_2O_3$ molar ratio of 35 and an $SiO_2/Fe_2O_3$ molar ratio of 144. The catalyst had an average crystal grain diameter of 0.28 μm, and had a full width at half maximum (FWHM) of the X-ray crystal diffraction (302) plane of 0.28°. After a hydrothermal endurance treatment at 700° C. for 20 hours in a 10-vol % water vapor atmosphere, the catalyst showed an $NO_X$ reduction percentage of 38% at a reaction temperature of 200° C. The catalyst which had not undergone the endurance treatment showed an $NO_X$ reduction percentage of 77% at a reaction temperature of 200° C.

The relationship between the properties of each of the nitrogen oxide removal catalysts obtained in Examples 21 to 23 and Comparative Examples 7 to 9 and the $NO_X$ reduction percentages thereof at 200° C. is shown in the following Table 8.

TABLE 8

| | Si/Al$_2$ ratio | Si/Fe$_2$ ratio | Percentage of NO$_x$ reduction at 200° C. (%) | | Full width at half maximum (°) | Grain diameter (μm) |
| --- | --- | --- | --- | --- | --- | --- |
| | | | Initial | After endurance treatment | | |
| Example 21 | 35 | 144 | 50 | 50 | 0.36 | 0.28 |
| Example 22 | 26 | 138 | 47 | 47 | 0.34 | 0.26 |
| Example 23 | 34 | 56 | 55 | 46 | 0.36 | 0.24 |
| Comparative Example 7 | 102 | 49 | 54 | 36 | 0.34 | 0.24 |
| Comparative Example 8 | 88 | 30 | 59 | 43 | 0.38 | 0.19 |
| Comparative Example 9 | 35 | 144 | 77 | 38 | 0.28 | 0.28 |

As apparent from the table, the catalysts of Examples 21 to 23 are higher in the percentage of $NO_X$ reduction at 200° C. after the endurance treatment than the catalysts of Comparative Examples 7 to 9.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 22, 2009 (Application No. 2009-290442), a Japanese patent application filed on Dec. 25, 2009 (Application No. 2009-293723), and a Japanese patent application filed on Dec. 25, 2009 (Application No. 2009-293724), the contents thereof being incorporated herein by reference.

INDUSTRIAL APPLICABILITY

The highly crystalline β-type iron silicates of the invention can be used, for example, as catalysts for removing nitrogen oxides, and are applicable to the removal of nitrogen oxides from automobile exhaust gases.

The nitrogen oxide removal catalyst of the invention can be utilized for removing nitrogen oxides from an automobile exhaust gas in the presence of a reducing agent. Consequently, the invention has a significant industrial value.

The invention claimed is:

1. A β-type framework structure iron silicate comprising primary particles obtained from growth of crystal, characterized in that the iron silicate has a fluorine content not more than 400 ppm by weight of the dry crystals, that the primary particles of the crystals have a truncated square bipyramidal morphology in an examination with a scanning electron microscope, and that the whole or part of the iron is contained in the β-type framework structure.

2. The β-type iron silicate according to claim 1 which is characterized by having an $SiO_2/Al_2O_3$ (molar ratio) of 300 or more and containing iron in an amount of 5.5% by weight or more based on the dry weight of the crystals.

3. A process for producing the n-type iron silicate according to claim 1, characterized by hydrothermally crystallizing the following starting-material composition

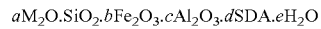

$$aM_2O.SiO_2.bFe_2O_3.cAl_2O_3.dSDA.eH_2O$$

(M represents $Na^+$ or $K^+$, SDA represents a structure-directing agent, and a, b, c, d, and e respectively indicate the molar ratios of the $M_2O$, $Fe_2O_3$, $Al_2O_3$, SDA, and $H_2O$ to the $SiO_2$), wherein the ($SDA/SiO_2$) molar ratio (d) is 0.10-0.35 and (e) is 7 to 15.

4. The process for producing a β-type iron silicate according to claim 3 which is characterized in that the starting-material composition satisfies the following:

a=0.075 to 0.50 b=0.01 to 0.05 and c=0.01 or less.

* * * * *

UNITED STATES PATENT AND TRADEMARK OFFICE
CERTIFICATE OF CORRECTION

PATENT NO. : 9,675,935 B2
APPLICATION NO. : 13/503450
DATED : June 13, 2017
INVENTOR(S) : Y. Naraki et al.

It is certified that error appears in the above-identified patent and that said Letters Patent is hereby corrected as shown below:

In the Claims

Column 36, Line 5 (Claim 3, Line 1) please change "n-type" to -- β-type --

Signed and Sealed this
Ninth Day of January, 2018

Joseph Matal
*Performing the Functions and Duties of the
Under Secretary of Commerce for Intellectual Property and
Director of the United States Patent and Trademark Office*